US00RE41772E

(19) United States
(12) Reissued Patent
Nagami et al.

(10) Patent Number: US RE41,772 E
(45) Date of Reissued Patent: Sep. 28, 2010

(54) ROUTER DEVICE AND DATAGRAM TRANSFER METHOD FOR DATA COMMUNICATION NETWORK SYSTEM

(75) Inventors: Kenichi Nagami, Chiba-ken (JP); Yasuhiro Katsube, Kanagawa-ken (JP)

(73) Assignee: Kabushiki Kaisha Toshiba, Tokyo (JP)

(21) Appl. No.: 10/629,735

(22) Filed: Jul. 30, 2003

Related U.S. Patent Documents

Reissue of:
(64) Patent No.: 5,822,319
Issued: Oct. 13, 1998
Appl. No.: 08/649,514
Filed: May 17, 1996

(30) Foreign Application Priority Data

May 18, 1995 (JP) ..... 7-120150
Jan. 23, 1996 (JP) ..... 8-009405

(51) Int. Cl.
*H04L 12/28* (2006.01)
*H04L 12/56* (2006.01)

(52) U.S. Cl. ..... 370/392; 370/397; 370/409; 370/474

(58) Field of Classification Search ..... 370/392, 370/397, 409, 474
See application file for complete search history.

(56) References Cited

U.S. PATENT DOCUMENTS 4,975,906 A 12/1990 Takiyasu et al.
5,208,811 A 5/1993 Kashio et al.
5,287,535 A * 2/1994 Sakagawa et al. ..... 370/389
5,357,508 A 10/1994 Le Boudec et al.
5,420,858 A 5/1995 Marshall et al.
5,426,637 A 6/1995 Derby et al.
5,450,406 A 9/1995 Esaki et al.
5,452,293 A 9/1995 Wilkinson et al.
5,452,296 A * 9/1995 Shimizu ..... 370/399
5,463,621 A * 10/1995 Suzuki ..... 370/399
5,490,140 A * 2/1996 Abensour et al. ..... 370/397

(Continued)

FOREIGN PATENT DOCUMENTS

EP 0 570 630 5/1992
JP 02-167491 6/1990
JP 4-56546 2/1992
JP 6-152634 5/1994
JP 6-311185 11/1994

OTHER PUBLICATIONS

M. Ohta et al., Internet Draft, draft–ohta–ip–over–atm–02.txt, Conventional IP Over ATM, Mar. 1995, pp. 1–10.

(Continued)

*Primary Examiner*—Alpus H Hsu
(74) *Attorney, Agent, or Firm*—Oblon, Spivak, McClelland, Maier & Neustadt, L.L.P.

(57) ABSTRACT

A router device realizing a datagram transfer method for improving the datagram transfer efficiency by ascertaining the transfer target and/or the requested quality of service without referring to the datagram content. The router device has network interfaces connected with networks including at least one virtual connection oriented network, a table for registering a correspondence between a virtual connection identifier and a transfer target network interface and/or a quality of service, a connection identifier analysis unit for determining a transfer target network interface and/or a quality of service for a datagram entered from one virtual connection, by referring to the table according to a virtual connection identifier of that one virtual connection. The datagram can be transferred to the determined transfer target network interface, while applying a priority control for datagrams to be transferred by the router device according to the determined quality of service.

35 Claims, 17 Drawing Sheets

U.S. PATENT DOCUMENTS

| | | | | | |
|---|---|---|---|---|---|
| 5,490,141 | A | * | 2/1996 | Lai et al. | 370/397 |
| 5,499,238 | A | * | 3/1996 | Shon | 370/399 |
| 5,530,806 | A | * | 6/1996 | Condon et al. | 714/49 |
| 5,583,865 | A | * | 12/1996 | Esaki et al. | 370/397 |
| 5,633,866 | A | * | 5/1997 | Callon | 370/397 |
| 5,649,108 | A | | 7/1997 | Spiegel et al. | |
| 5,666,361 | A | * | 9/1997 | Aznar et al. | 370/392 |
| 5,666,487 | A | * | 9/1997 | Goodman et al. | 709/246 |
| 5,818,842 | A | * | 10/1998 | Burwell et al. | 370/397 |

OTHER PUBLICATIONS

Yasuhiro Katsube et al., Internet Draft draft–katsube–flow–mapping–di–conn–00.txt, Mapping of IP Flow to Datalink Layer Connection, May 23, 1995, pp. 1–14.

H. Esaki et al., Internet Draft, draft–esaki–co–ci–ip–forw–atm–00.txt, Connection Oriented and Connectionless IP Forwarding Over ATM Networks, Oct. 14, 1994, pp. 1–17.

Yasuhiro Katsube et al., Internet Draft, overview & It; draft–katsube–router–atm–overview–00.txt&gt, Router Architecture Extensions for ATM; Overview, Mar. 1, 1995, pp. 1–20.

Hiroshi Esaki et al., Evaluation of High Speed Multimedia Communication Architecture in ATM Networks, IEICE Trans. Commun., vol. E77–B, No. 11 1994 pp. 1–13.

Hiroshi Esaki et al., High Speed Datagram Delivery Over Internet Using ATM Technology, IEICE Trans. Communications, vol. E78–B, Aug. 1995, pp. 1–11.

Hiroshi Esaki et al, Connection Admission Control in ATM Networks, IEICE Trans. Commun., vol. E–77–B No. 1 1994, pp. 1–13.

Hiroshi Esaki et al, Datagram Delivery in an ATM–Internet, IEICE Trans. Commun., vol. E–77–B, No. 3 1994, pp. 1–13.

Anthony Alles, ATM Internetworking, May 1995, pp. 1–58.

J.Y. Le Boudec et al., A Direct ATM Connectionless Service, Aug. 23, 1991, pp. 1–15.

Donald F. Box et al., Architecture and Design of Connectionless Data Service for a Public ATM Network, Dept. of Information and Computer Science, pp. 1–28.

John David Cavanaugh et al., Internetworking with ATM WANs, Minnesota Supercomputer Center, Inc. Dec. 14, 1992, pp. 403–420.

P. Crocett et al, ATM–based SMDS for LANs/MANs Interconnection, International Switching Symposium, 1992, Oct. 25–30, 1992, vol. 1, pp. 87–91.

D. Deloddere et al., Architecture and Implementation of A Connectionless Server For B–ISDN, ISS '92, Oct. 1992, vol. 1, pp. 224–228.

G. Floretto et al., Connectionless Service Handling Within B–ISDN, Globecom '91, pp. 217–222.

Takeshi Kawasaki et al., A Study On High Speed Data Communication System Using ATM , Globecom '91, Fujitsu Laboratories Ltd., pp. 2105–2109.

Peter Newman, ATM LANs: The Customer Premises ATM Network, 3rdB–ISDN Technical Workshop, Nice, France, Apr. 5–8, 1993, pp. 1–18.

Katsuyuki Yamazaki et al., KDD R&D Laboratories, International Switching Symposium May 1990, Connectionless Cell Switching Schemes for Broadband ISDN, Proceedings Session A9, Paper #2, vol. VI, pp. 6–10.

C. Brazdziunas, Png Support for ATM Services, Mar. 1994, Network Working Group.

M. Perez et al., ATM Signaling Support For IP over ATM, Internet Draft, Jul. 1994, pp. 1–19, http://www.waterspring.org/pub/id/draft–.etf–ipatm–sig–01.txt.

Y. Rekhter, Application of the Border Gateway Protocol in the internet, Networking Group, Request for Comments: 1268, Obsoletes: RFC 1164, T.J. Watson Research Center, IBM Corp., Oct. 1991, pp. 1–13.

Dave Katz, NBMA Next Hop Resolution Protocol, (NHRP), Internet Draft, Aug. 25, 1994, <Draft–IETF–ROLC–NHRP–02.txt>, pp. 1–29.

Yasuhiro Katsube et al., Router Architecture Extensions for ATM, Internet Draft, Mar. 1, 1995, pp. 1–21. Overview & it; draft–katsube–router–atm–overview–oo.txt&gt.

Juniper Networks, Inc.'s Responses to Toshiba Corporation First Set of Interrogatories (Nos. 1–10), Jun. 11, 2004 (Redacted), pp. 1–20.

Juniper Networks, Inc's Suppl. Response to Toshiba Corp.'s First Set of Interrogatories (Nos. 1–10), Dec. 27, 2004 (Redacted), pp. 1–93.

Juniper Networks, Inc's Suppl. Response to Toshiba Corp.'s First Set of Interrogatories (Nos. 1–10), Apr. 11, 2005, pp. 1–230.

Riverstone Network, Inc's Suppl. Response to Toshiba Corp.'s Interrogatory No. 4, Jan. 3, 2005, pp. 1–4.

Riverstone Network, Inc's Second Suppl. Response to Toshiba Corp.'s Interrogatory No. 4, Apr. 11, 2005, pp. 1–13.

Israel Cidon et al., "Fast Connection Establishment in High Speed Networks," Sep. 1990, pp. 287–296.

Reuven Cohen et al., "Connection Management and Rerouting in ATM Networks," Jun. 1994, pp. 184–191.

H. Esaki et al., "Connection Oriented and Connectionless IP Forwarding over ATM Networks," Internet Draft, Oct. 14, 1994, pp. 1–10.

M. Ohta et al, "Conventional IP over ATM," *Internet Draft*, Mar. 1995, <draft–ohta–ip–over–atm–00.txt>, pp. 1–10.

M. Perez et al., "ATM Signaling Support for IP over ATM," Internet Draft, Jul. 1994, pp. 1–19.

Perez et al., "ATM Signaling Support for IP over ATM," Feb. 1995, pp. 1–32.

Y. Rekhter et al, "Application of the Border Gateway Protocol in the Internet," RFC 1268, Oct. 1991, pp. 1–13.

Lixia Zhang et al., "RSVP: A New Resource ReSerVation Protocol," *IEEE Network*, vol. 7, No. 5, Sep. 1993, pp. 1–22.

David Katz et al., NBMA Next Hop Resolution Protocol (NHRP), Draft, Aug. 25, 1994, <Draft–IETF–ROLC–NHRP–02.txt>, pp. 1–29.

Jean–Yves Le Boudec et al., "A Direct ATM Connectionless Service," IBM Temporary Working Doc., Aug. 23, 1991, pp. 1–15.

Donald F. Box et al., "Architecture and Design of Connectionless Data Service for a Public ATM Network," Mar. 1993, pp. 1–28.

John Cavanaugh et al., "Internetworking with ATM WANs," Minnesota Super Computing Center Technical Report, Dec. 14, 1992, pp. 403–420.

D. Deloddere et al., "Architecture and Implementation of a Connectionless Server for B–ISDN," International Switching Symposium, Proceedings, Oct. 1992, vol. 1, pp. 12–223–228.

G. Floretto et al., "Connectionless Service Handling Within B–ISDN," Globecom 1991, Dec., pp. 0217–0222.

Takeshi Kawasaki et al., "A Study on High Speed Data Communication System Using ATM," GlobeCom 1991, Dec. pp. 2105–2109.

Katsuyuki Yamazaki et al., "Connectionless Cell Switching Schemes for Broadband ISDN," Session A9, Paper #2, Proceedings vol. VI, May 28, 1990, pp. 5–10.

H. Esaki et al, "Datagram Delivery in an ATM–Internet," IEICE Trans. Commun. vol. E77–B, No. 3 1994, pp. 1–13.

H. Esaki et al, "Class D Service Architecture in an ATM–Internet," IEEE (G–7803–1825–0/94) 1994, pp. 1312–1318.

Amended Answer to Plaintiff Toshiba Corporation's Amended Complaint and Additional Defenses of Defendant Juniper Networks, Inc., Jul. 15, 2005.

Request for Comments 1190 by the IETF, CIP Working Group, Oct. 1990, pp. 1–148.

Application of BGP in the Internet, Jeffrey C. Honig et al., RFC 126B, Oct. 1991, pp. 1–13.

Guru Parulkar et al., A Strategy for Integrating IP with ATM, Department of Computer Science, Washington University pp. 1–10.

Ginish P. Chandranmenon et al., Trading Packet Headers for Packet Processing, pp. 162–173.

Ken–Ichi–Sato et al., Broad–Band ATM Network Architecture Based on Virtual Paths, 1990 IEEE, Transaction on Communications, vol. 38, No. 8, Aug. 1990, pp. 1212–1222.

Wendy M. Harman et al., ISDN Protocols for Connection Control, IEE Journal on Selected Areas in Communications, vol. 7, No. 7, Sep. 1989, pp. 1034–1042.

Rick Bubenik et al., Multipoint Connection Management in High Speed Networks, INFOCOM '91: Proceedings of the Tenth Annual Joint Conference of the IEEE Computer and Communications Societies, Apr. 1991, pp. 59–68.

M. Ohta et al., Conventional IP over ATM, Internet Draft, Jul. 1994, pp. 1–10.

* cited by examiner

FIG.5

21

DATAGRAM ANALYSIS UNIT

210

ROUTING TABLE

| DESTINATION ADDRESS (DESTINATION) | OUTPUT I/F | NEXT HOP NETWORK LAYER ADDRESS OR OUTPUT VIRTUAL CONNECTION ID (ADDRESS) |
|---|---|---|
| | | |

FIG.6

12

CONNECTION ID ANALYSIS UNIT

120

TRANSFER TABLE

| INPUT CONNECTION ID (INPUT) | OUTPUT I/F | NEXT HOP NETWORK LAYER ADDRESS OR OUTPUT VIRTUAL CONNECTION ID (ADDRESS) |
|---|---|---|
| | | |

ROUTER DEVICE AND DATAGRAM TRANSFER METHOD FOR DATA COMMUNICATION NETWORK SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a router device for connecting a virtual connection network with another virtual connection network or non-virtual connection network, and a datagram transfer method using a router device in a data communication network system.

2. Description of the Background Art

A router device is used for connecting LANs, and transferring datagram from one LAN to another LAN. Datagram contains communication data as well as source and final destination network layer addresses (such as IP addresses in a case of IP), and the router device determines an output interface and a next transfer node (a router device or a host functioning as a communication terminal) for the datagram according to these address information.

Here, a datagram transfer scheme in a conventional router device will be described with reference to FIG. 1, for an exemplary case of a router device connected with Ethernet which is a non-virtual connection oriented LAN. When an Ethernet frame (datalink frame) is received from a LAN, a reception unit 911 changes the received datalink frame into a datagram suitable for handling at the network layer. Then, a datagram analysis unit 921 determines an output interface and a network layer address of a next transfer node (a host or a router device) from the final destination address of that datagram, and gives that datagram to a datagram processing unit 922 of the determined output interface via a transfer unit 930. The datagram processing unit 922 which received the datagram then carries out the network layer processing (a processing to reduce TTL (Time To Live), a checksum calculation, an optional processing, etc. in a case of IP). Finally, a transmission unit 913 determines an Ethernet address (datalink layer address) from the network layer address of the next transfer node, constructs an Ethernet frame from that address and the datagram, and outputs the constructed Ethernet frame to the LAN.

The datagram transfer is carried out similarly in a case of ATM which is a virtual connection oriented LAN. First, when an ATM cell is received from a LAN, the received ATM cell is changed into an AAL (ATM adaptation Layer) frame (datalink frame), and this AAL frame is changed into a datagram suitable for handling at the network layer. Then, an output interface and a network layer address of a next transfer node is determined from the final destination address of that datagram, and the network layer processing is carried out. Finally, at the transmission unit 913, a virtual connection identifier of a virtual connection for transferring the datagram is determined from the network layer address of the next transfer node, an ATM cell is constructed from that identifier and the datagram, and the constructed ATM cell is outputted to the LAN.

Now, regardless of whether it is a router device connected with the virtual connection oriented LAN or a router device connected with the non-virtual connection oriented LAN, at a time of transferring datagram, an output target is determined by referring to datagram content (including a header information such as a source address, a destination address, and a type of service, and an upper layer information such as a port address in a case of IP) at a datagram analysis unit. For this reason, a considerable transfer processing time is taken by the datagram analysis unit, and consequently it has been impossible to realize a high speed transfer of datagram.

Moreover, when the requested quality of service is different for different datagrams to be transferred, it is preferable to carry out the processing which accounts for the requested quality of service for different datagrams rather than just processing datagrams according to an order of their arrivals. To this end, as shown in FIG. 2, it is possible to provide a function called scheduler 961, which controls an order by which datagrams are to be given to a next function not just according to their arrival order but also by accounting for their requested quality of service.

However, an information concerning the quality of service requested to each datagram is to be obtained by referring to datagram content, so that as shown in FIG. 2, it has been necessary to carry out a priority control processing (scheduling) at the scheduler 961 only after the processing at the datagram analysis unit 921 is applied, according to the result of this processing at the datagram analysis unit 921. This scheduling is effective in a case of output processing datagrams in an order of their requested quality of service when a transmission interface to a next hop node does not have a sufficient capacity.

But, in a case where the analysis processing power of the datagram analysis unit 921 itself is not sufficient, despite of the fact that a processing wait time at the datagram analysis unit 921 can be a problem from a viewpoint of an overall performance, the scheduling accounting for the quality of service cannot be carried out at this point because the priority level information is not yet available at this point, and consequently it has been necessary for the scheduler 961 to carry out the processing in the arrival order.

Thus in a conventional router device, the transfer target cannot be determined and the quality of service cannot be ascertained until the datagram content is referred.

SUMMARY OF THE INVENTION

It is therefore an object of the present invention to provide a router device and a datagram transfer method capable of improving the datagram transfer efficiency by ascertaining the transfer target without referring to the datagram content.

It is another object of the present invention to provide a router device and a datagram transfer method capable of improving the datagram transfer efficiency by ascertaining the requested quality of service for the datagram without referring to the datagram content, and carrying out the transfer accounting for the requested quality of service for the datagram more effectively.

According to one aspect of the present invention there is provided a router device for transferring datagrams among networks, comprising: network interfaces connected with networks including at least one virtual connection oriented network; table means for registering a correspondence between a virtual connection identifier and a transfer target network interface; connection identifier analysis means for determining a transfer target network interface for a datagram entered from one virtual connection, by referring to the table means according to a virtual connection identifier of said one virtual connection; and transfer means for transferring the datagram to the transfer target network interface determined by the connection identifier analysis means.

According to another aspect of the present invention there is provided a router device for transferring datagrams among networks, comprising: at least one network interface connected with at least one virtual connection oriented network; tables means for registering a correspondence between a virtual connection identifier and an output virtual connection identifier; connection identifier analysis means for determining an output virtual connection identifier for a datagram entered from one virtual connection, by referring to the table means according to a virtual connection identifier of said one virtual connection; and transfer means for transferring the datagram such that the datagram is outputted to a virtual connection having the output virtual connection identifier determined by the connection identifier analysis means.

According to another aspect of the present invention there is provided a router device for transferring datagrams among networks, comprising: at least one network interface connected with at least one virtual connection oriented network; table means for registering a correspondence between a virtual connection identifier and a quality of service; connection identifier analysis means for determining a quality of service for a datagram entered from one virtual connection, by referring to the table means according to a virtual connection identifier of said one virtual connection; scheduler means for applying a priority control for datagrams to be transferred by the router device according to the quality of service determined by the connection identifier analysis means; and transfer means for transferring the datagram to which the priority control is applied by the scheduler means.

According to another aspect of the present invention there is provided a router device for transferring ATM cells from an ATM network, comprising: network interfaces connected with networks including at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network; table means for registering a correspondence between a virtual connection identifier and a transfer target network interface; connection identifier analysis means for determining a transfer target network interface for an AAL frame assembled from ATM cells entered from one virtual connection, by referring to the table means according to a virtual connection identifier of said one virtual connection; processing means for determining a transfer target network interface for the AAL frame by assembling datagram from the AAL frame and analyzing the assembled datagram, when the table means does not register the transfer target network interface in correspondence to the virtual connection identifier of said one virtual connection; and transfer means for transferring the AAL frame to the transfer target network interface determined by one of the connection identifier analysis means and the processing means.

According to another aspect of the present invention there is provided a router device for transferring AAL frames from an ATM network through network interfaces connected with networks including at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network, the router device comprising: table means for registering a correspondence between a virtual connection identifier and a transfer target network interface; connection identifier analysis means for determining a transfer target network interface for an AAL frame assembled from ATM cells entered from one virtual connection, by referring to the table means according to a virtual connection identifier of said one virtual connection; processing means for determining a transfer target network interface for the AAL frame by assembling datagram from the AAL frame and analyzing the assembled datagram, when the table means does not register the transfer target network interface in correspondence to the virtual connection identifier of said one virtual connection; and transfer means for transferring the AAL frame to the transfer target network interface determined by one of the connection identifier analysis means and the processing means.

According to another aspect of the present invention there is provided an ATM network interface card device for interfacing an ATM network and a bus connecting other network interfaces connected with other networks, the ATM network interface card device comprising: reception means for receiving ATM cells transmitted from the ATM network and assembling an AAL frame from the received ATM cells; table means for registering a correspondence between a virtual connection identifier and a transfer target network interface; connection identifier analysis means for determining a transfer target network interface for one AAL frame assembled from ATM cells entered from one virtual connection, by referring to the table means according to a virtual connection identifier of said one virtual connection; and transfer means for transferring said one AAL frame through the bus to the transfer target network interface determined by the connection identifier analysis means.

According to another aspect of the present invention there is provided a router device for transferring ATM cells from an ATM network, comprising: at least one network interface connected with at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network; table means for registering a correspondence between a virtual connection identifier and an output virtual connection identifier; connection identifier analysis means for determining an output virtual connection identifier for an AAL frame assembled from ATM cells entered from one virtual connection, by referring to the table means according to a virtual connection identifier of said one virtual connection; processing means for determining an output virtual connection identifier for the AAL frame by assembling datagram from the AAL frame and analyzing the assembled datagram, when the table means does not register the output virtual connection identifier in correspondence to the virtual connection identifier of said one virtual connection; and transfer means for transferring the AAL frame such that the AAL frame is outputted to a virtual connection having the output virtual connection identifier determined by one of the connection identifier analysis means and the processing means.

According to another aspect of the present invention there is provided a router device for transferring datagrams among networks, comprising: at least one network interface connected with at least one virtual connection oriented network; table means for registering a correspondence between a virtual connection identifier and a protocol type information indicating a type and/or a version of a protocol; connection identifier analysis means for determining a protocol type information for a datagram entered from one virtual connection, by referring to the table means according to a virtual connection identifier of said one virtual connection;

datagram analysis means for determining a transfer target network interface/next hop network layer address for the datagram according to a datagram content of the datagram, the datagram analysis means having a plurality of processors in correspondence to different protocols, and the datagram is entered into one of said plurality of processors which corresponds to a protocol of a type and/or a version indicated by the protocol type information determined by the connection identifier analysis means; and transfer means for transferring the datagram to the transfer target network interface/next hop network layer address determined by the datagram analysis means.

According to another aspect of the present invention there is provided a method for transferring datagrams among networks, using a router device having network interfaces connected with networks including at least one virtual connection oriented network, the method comprising the steps of: registering a correspondence between a virtual connection identifier and a transfer target network interface in a table provided at the router device; determining a transfer target network interface for a datagram entered from the virtual connection at the router device, by referring to the table according to a virtual connection identifier of said one virtual connection; and transferring the datagram to the transfer target network interface determined by the determining step.

According to another aspect of the present invention there is provided a method for transferring datagrams among networks, using a router device having at least one network interface connected with at least one virtual connection oriented network, the method comprising the steps of: registering a correspondence between a virtual connection identifier and an output virtual connection identifier in a table provided at the router device; determining an output virtual connection identifier for a datagram entered from one virtual connection, by referring to the table according to a virtual connection identifier of said one virtual connection; and transferring the datagram such that the datagram is outputted to a virtual connection having the output virtual connection identifier determined by the determining step.

According to another aspect of the present invention there is provided a method for transferring datagrams among networks, using a router device having at least one network interface connected with at least one virtual connection oriented network, the method comprising the steps of: registering a correspondence between a virtual connection identifier and a quality of service in a table provided at the router device; determining a quality of service for a datagram entered from one virtual connection at the router device, by referring to the table according to a virtual connection identifier of said one virtual connection; applying a priority control for datagrams to be transferred by the router device according to the quality of service determined by the determining step; and transferring the datagram to which the priority control is applied by the applying step.

According to another aspect of the present invention there is provided a method for transferring ATM cells from an ATM network, using a router device having network interfaces connected with networks including at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network, the method comprising the steps of: registering a correspondence between a virtual connection identifier and a transfer target network interface in a table provided at the router device; determining a transfer target network interface for an AAL frame assembled from ATM cells entered from one virtual connection, by referring to the table according to a virtual connection identifier of said one virtual connection; processing the AAL frame to determine a transfer target network interface for the AAL frame by assembling datagram from the AAL frame and analyzing the assembled datagram, when the table does not register the transfer target network interface in correspondence to the virtual connection identifier of said one virtual connection; and transferring the AAL frame to the transfer target network interface determined by one of the determining step and the processing step.

According to another aspect of the present invention there is provided a method for transferring AAL frames from an ATM network, using a router device having network interfaces connected with networks including at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network, the method comprising the steps of: registering a correspondence between a virtual connection identifier and a transfer target network interface in a table provided at the router device; determining a transfer target network interface for an AAL frame assembled from ATM cells entered from one virtual connection, by referring to the table according to a virtual connection identifier of said one virtual connection; processing the AAL frame to determine a transfer target network interface for the AAL frame by assembling datagram from the AAL frame and analyzing the assembled datagram, when the table does not register the transfer target network interface in correspondence to the virtual connection identifier of said one virtual connection; and transferring the AAL frame to the transfer target network interface determined by one of the determining step and the processing step.

According to another aspect of the present invention there is provided a method for interfacing an ATM network and a bus connecting other network interfaces connected with other networks, the method comprising the steps of: receiving ATM cells transmitted from the ATM network and assembling an AAL frame from the received ATM cells; registering a correspondence between a virtual connection identifier and a transfer target network interface in a table; determining a transfer target network interface for one AAL frame assembled from ATM cells entered from one virtual connection, by referring to the table according to a virtual connection identifier of said one virtual connection; and transferring said one AAL frame through the bus to the the transfer target network interface determined by the determining step.

According to another aspect of the present invention there is provided a method for transferring ATM cells from an ATM network, using a router device having at least one network interface connected with at least one ATM network, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network, the method comprising the steps of: registering a correspondence between a virtual connection identifier and an output virtual connection identifier in a table provided at the router device; determining an output virtual connection identifier for an AAL frame assembled from ATM cells entered from one virtual connection, by referring to the table according to a virtual connection identifier of said one virtual connection; processing the AAL frame to determine an output virtual connection identifier for the AAL frame by assembling datagram from the AAL frame and analyzing the assembled datagram, when the table does not register the output virtual connection identifier in correspondence to the virtual connection identifier of said one virtual connection; and transferring the AAL frame such that the AAL frame is outputted to a virtual connection having the output virtual connection identifier determined by one of the determining step and the processing step.

According to another aspect of the present invention there is provided a method for transferring datagrams among networks, using a router device having at least one network interface connected with at least one virtual connection oriented network, the method comprising the steps of: registering a correspondence between a virtual connection identifier and a protocol type information indicating a type and/or a version of a protocol in a table provided at the router device; determining a protocol type information for a datagram entered from one virtual connection, by referring to the table according to a virtual connection identifier of said one virtual connection; determining a transfer target network interface/next hop network layer address for the datagram according to a datagram content of the datagram, wherein a plurality of processors are provided at the router device in correspondence to different protocols, and the datagram is entered into one of said plurality of processors which corresponds to a protocol of a type and/or a version indicated by the protocol type information determined by the determining step; and transferring the datagram to the determined transfer target network interface/next hop network layer address.

According to another aspect of the present invention there is provided a data communication network system, comprising: networks including at least one virtual connection oriented network; a transmission node provided in each network for transmitting datagrams such that datagrams destined to an identical destination are transmitted through specific virtual connection; and a router device for connecting at least two of the networks, the router device including: network interfaces connected with said at least two of the networks; table means for registering a correspondence between a virtual connection identifier and a transfer target network interface; connection identifier analysis means for determining a transfer target network interface for a datagram entered from one virtual connection, by referring to the table means according to a virtual connection identifier of said one virtual connection; and transfer means for transferring the datagram to the transfer target network interface determined by the connection identifier analysis means.

According to another aspect of the present invention there is provided a data communication network system, comprising: networks including at least one virtual connection oriented network; a transmission node provided in each network for transmitting datagrams such that datagrams destined to an identical destination are transmitted through specific virtual connections; and a router device for connecting at least two of the networks, the router device including: at least one network interface connected with said at least two of the networks; table means for registering a correspondence between a virtual connection identifier and an output virtual connection identifier; connection identifier analysis means for determining an output virtual connection identifier for a datagram entered from one virtual connection, by referring to the table means according to a virtual connection identifier of said one virtual connection; and transfer means for transferring the datagram such that the datagram is outputted to a virtual connection having the output virtual connection identifier determined by the connection identifier analysis means.

According to another aspect of the present invention there is provided a data communication network system, comprising: networks including at least one virtual connection oriented network; a transmission node provided in each network for transmitting datagrams such that datagrams with an identical quality of service are transmitted through specific virtual connections; and a router device for connecting at least two of the networks, the router device including: at least one network interface connected with said at least two of the networks; table means for registering a correspondence between a virtual connection identifier and a quality of service; connection identifier analysis means for determining a quality of service for a datagram entered from one virtual connection, by referring to the table means according to a virtual connection identifier of said one virtual connection; scheduler means for applying a priority control for datagrams to be transferred by the router device according to the quality of service determined by the connection identifier analysis means; and transfer means for transferring the datagram to which the priority control is applied by the scheduler means.

According to another aspect of the present invention there is provided a data communication network system, comprising: networks including at least one ATM network; a transmission node provided in each network for transmitting datagrams such that datagrams destined to an identical destination are transmitted through specific virtual connections; and a router device for connecting at least two of the networks, the router device including: network interfaces connected with said at least two of the networks, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network; table means for registering a correspondence between a virtual connection identifier and a transfer target network interface; connection identifier analysis means for determining a transfer target network interface for an AAL frame assembled from ATM cells entered from one virtual connection, by referring to the table means according to a virtual connection identifier of said one virtual connection; processing means for determining a transfer target network interface for the AAL frame by assembling datagram from the AAL frame and analyzing the assembled datagram, when the table means does not register the transfer target network interface in correspondence to the virtual connection identifier of said one virtual connection; and transfer means for transferring the AAL frame to the transfer target network interface determined by one of the connection identifier analysis means and the processing means.

According to another aspect of the present invention there is provided a data communication network system, comprising: networks including at least one ATM network; a transmission node provided in each network for transmitting datagrams such that datagrams destined to an identical destination are transmitted through specific virtual connections; and a router device for connecting at least two of the networks, and for transferring AAL frames from an ATM network through network interfaces connected with the networks, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network, the router device including: table means for registering a correspondence between a virtual connection identifier and a transfer target network interface; connection identifier analysis means for determining a transfer target network interface for an AAL frame assembled from ATM cells entered from one virtual connection, by referring to the table means according to a virtual connection identifier of said one virtual connection; processing means for determining a transfer target network interface for the AAL frame by assembling datagram from the AAL frame and analyzing the assembled datagram, when the table means does not register the transfer target network interface in correspondence to the virtual connection identifier of said one virtual connection; and transfer means for transferring the AAL frame to the transfer target network interface determined by one of the connection identifier analysis means and the processing means.

According to another aspect of the present invention there is provided a data communication network system, comprising: networks including at least one ATM network; a transmission node provided in each network for transmitting datagrams such that datagrams destined to an identical destination are transmitted through specific virtual connections; and a router device for connecting at least two of the networks including an ATM network; and an ATM network interface card device for interfacing an ATM network and a bus connecting other network interfaces connected with other networks, the ATM network interface card device including: reception means for receiving ATM cells transmitted from the ATM network and assembling an AAL frame from the received ATM cells; table means for registering a correspondence between a virtual connection identifier and a transfer target network interface; connection identifier analysis means for determining a transfer target network interface for one AAL frame assembled from ATM cells entered from one virtual connection, by referring to the table means according to a virtual connection identifier of said one virtual connection; and transfer means for transferring said one AAL frame through the bus to the the transfer target network interface determined by the connection identifier analysis means.

According to another aspect of the present invention there is provided a data communication network system, comprising: networks including at least one ATM network; a transmission node provided in each network for transmitting datagrams such that datagrams destined to an identical destination are transmitted through specific virtual connections; and a router device for connecting at least two of the networks, the router device including: at least one network interface connected with said at least two of the networks, each network interface connected with said at least one ATM network including reception means for receiving ATM cells transmitted from an ATM network and assembling an AAL frame from the received ATM cells, and transmission means for forming ATM cells from an AAL frame and transmitting the formed ATM cells to an ATM network; table means for registering a correspondence between a virtual connection identifier and an output virtual connection identifier; connection identifier analysis means for determining an output virtual connection identifier for an AAL frame assembled from ATM cells entered from one virtual connection, by referring to the table means according to a virtual connection identifier of said one virtual connection; processing means for determining an output virtual connection identifier for the AAL frame by assembling datagram from the AAL frame and analyzing the assembled datagram, when the table means does not register the output virtual connection identifier in correspondence to the virtual connection identifier of said one virtual connection; and transfer means for transferring the AAL frame such that the AAL frame is outputted to a virtual connection having the output virtual connection identifier determined by one of the connection identifier analysis means and the processing means.

According to another aspect of the present invention there is provided a data communication network system, comprising: networks including at least one virtual connection oriented network; a transmission node provided in each network for transmitting datagrams such that datagrams of an identical protocol type and/or version are transmitted through specific virtual connections; and a router device for connecting at least two of the networks, the router device including: at least one network interface connected with said at least two of the networks; table means for registering a correspondence between a virtual connection identifier and a protocol type information indicating a type and/or a version of a protocol; connection identifier analysis means for determining a protocol type information for a datagram entered from one virtual connection, by referring to the table means according to a virtual connection identifier of said one virtual connection; datagram analysis means for determining a transfer target network interface/next hop network layer address for the datagram according to a datagram content of the datagram, the datagram analysis means having a plurality of processors in correspondence to different protocols, and the datagram is entered into one of said plurality of processors which corresponds to a protocol of a type and/or a version indicated by the protocol type information determined by the connection identifier analysis means; and transfer means for transferring the datagram to the transfer target network interface/next hop network layer address determined by the datagram analysis means.

According to another aspect of the present invention there is provided a transmission node device for transmitting datagrams to a router device, comprising: table means for registering a correspondence between a destination and an output virtual connection identifier used by the router device; datagram analysis means for determining an output virtual connection identifier for a datagram to be transmitted, by referring to the table means according to a destination of the datagram; and transmission means for transmitting the datagram to a virtual connection having the output virtual connection identifier determined by the datagram analysis means, such that datagrams destined to an identical destination are transmitted through specific virtual connections.

According to another aspect of the present invention there is provided a transmission node device for transmitting datagrams to a router device, comprising: table means for registering a correspondence between a quality of service specifying information indicating a quality of service and an output virtual connection identifier, used by the router device; datagram analysis means for determining an output virtual connection identifier for a datagram to be transmitted, by referring to the table means according to a quality of service specifying information of the datagram; and transmission means for transmitting the datagram to a virtual connection having a virtual connectionn identifier identical to the output virtual connection identifier determined by the datagram analysis means, such that datagrams with an identical quality of service specifying information are transmitted through specific virtual connections.

According to another aspect of the present invention there is provided a transmission node device for transmitting datagrams to a router device, comprising: table means for registering a correspondence between a protocol type information indicating a type and/or a version of a protocol and an output virtual connection identifier used by the router device; datagram analysis means for determining an output virtual connection identifier for a datagram to be transmitted, by referring to the table means according to a type and/or a version of a protocol of the datagram; and transmission means for transmitting the datagram to a virtual connection having a virtual connection identifier identical to the output virtual connection identifier determined by the datagram analysis means, such that datagrams of an identical protocol type and/or version are transmitted through specific virtual connections.

According to another aspect of the present invention there is provided a method for transmitting datagrams to a router device, comprising the steps of: registering in a table a correspondence between a destination and an output virtual connection identifier used by the router device; determining an output virtual connection identifier for a datagram to be transmitted, by referring to the table according to a destination of the datagram; and transmitting the datagram to a virtual connection having the output virtual connection identifier determined by the determining step, such that datagrams destined to an identical destination are transmitted through specific virtual connections.

According to another aspect of the present invention there is provided a method for transmitting datagrams to a router device, comprising the steps of: registering in a table a correspondence between a quality of service specifying information indicating a quality of service and an output virtual connection identifier used by the router device; determining an output virtual connection identifier for a datagram to be transmitted, by referring to the table according to a quality of service specifying information of the datagram; and transmitting the datagram to a virtual connection having a virtual connection identifier identical to the output virtual connection identifier determined by the determining step, such that datagrams with an identical quality of service specifying information are transmitted through specific virtual connections.

According to another aspect of the present invention there is provided a method for transmitting datagrams to a router device, comprising the steps of: registering in a table a correspondence between a protocol type information indicating a type and/or a version of a protocol and an output virtual connection identifier used by the router device; determining an output virtual connection identifier for a datagram to be transmitted, by referring to the table according to a type and/or a version of a protocol of the datagram; and transmitting the datagram to a virtual connection having a virtual connection identifier identical to the output virtual connection identifier determined by the determining step, such that datagrams of an identical protocol type and/or version are transmitted through specific virtual connections.

Other features and advantages of the present invention will become apparent from the following description taken in conjunction with the accompanying drawings.

BRIEF DESCRIPTION OF THE DRAWINGS

FIG. 5 is a diagram showing a routing table in the datagram analysis unit of the router device of FIG. 4.

FIG. 6 is a diagram showing a transfer table in the connection identifier analysis unit of the router device of FIG. 4.

DETAILED DESCRIPTION OF THE PREFERRED EMBODIMENTS

Figure 1:
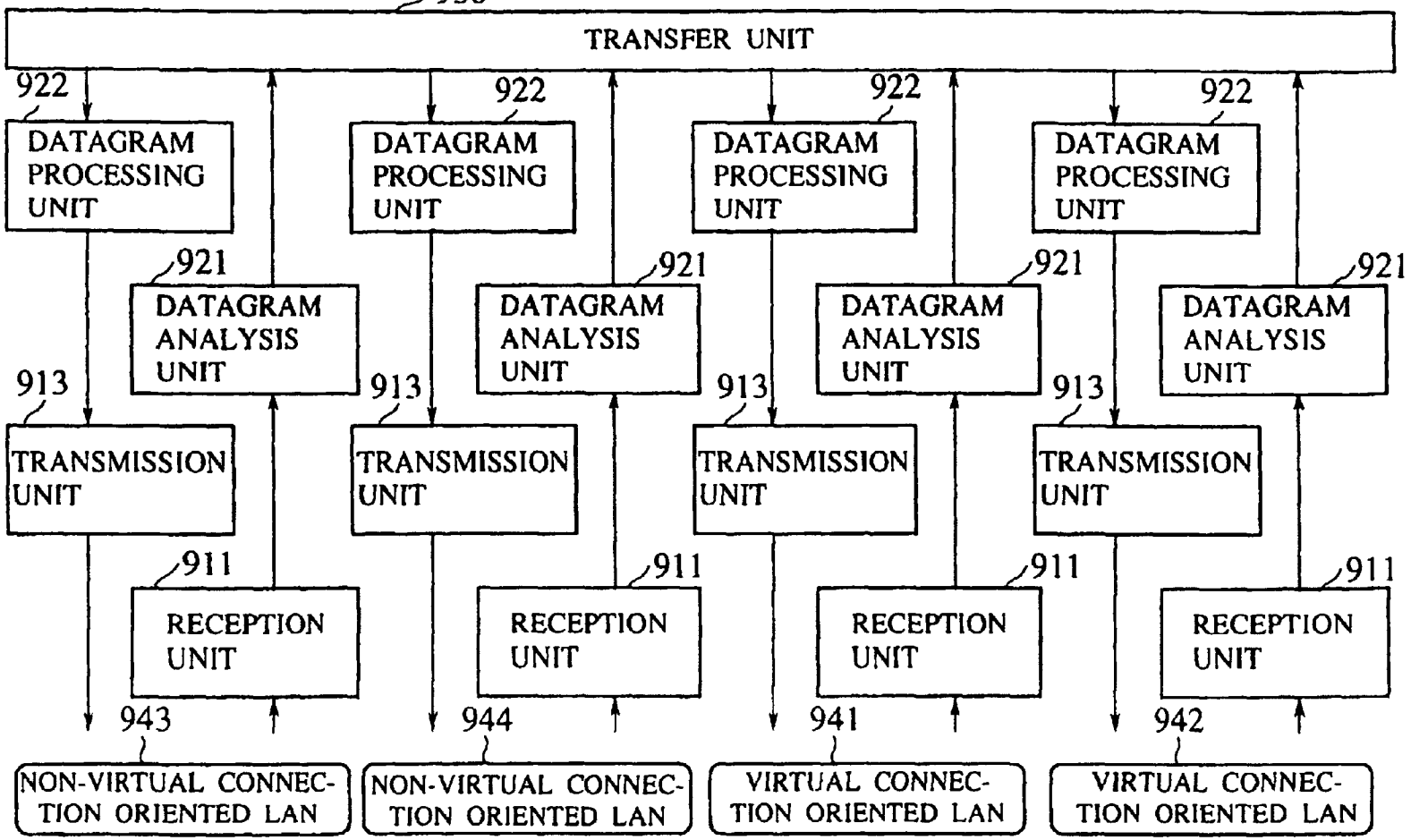
FIG.1 PRIOR ART
FIG. 1 is a schematic block diagram of one conventional router device.
Figure 2:
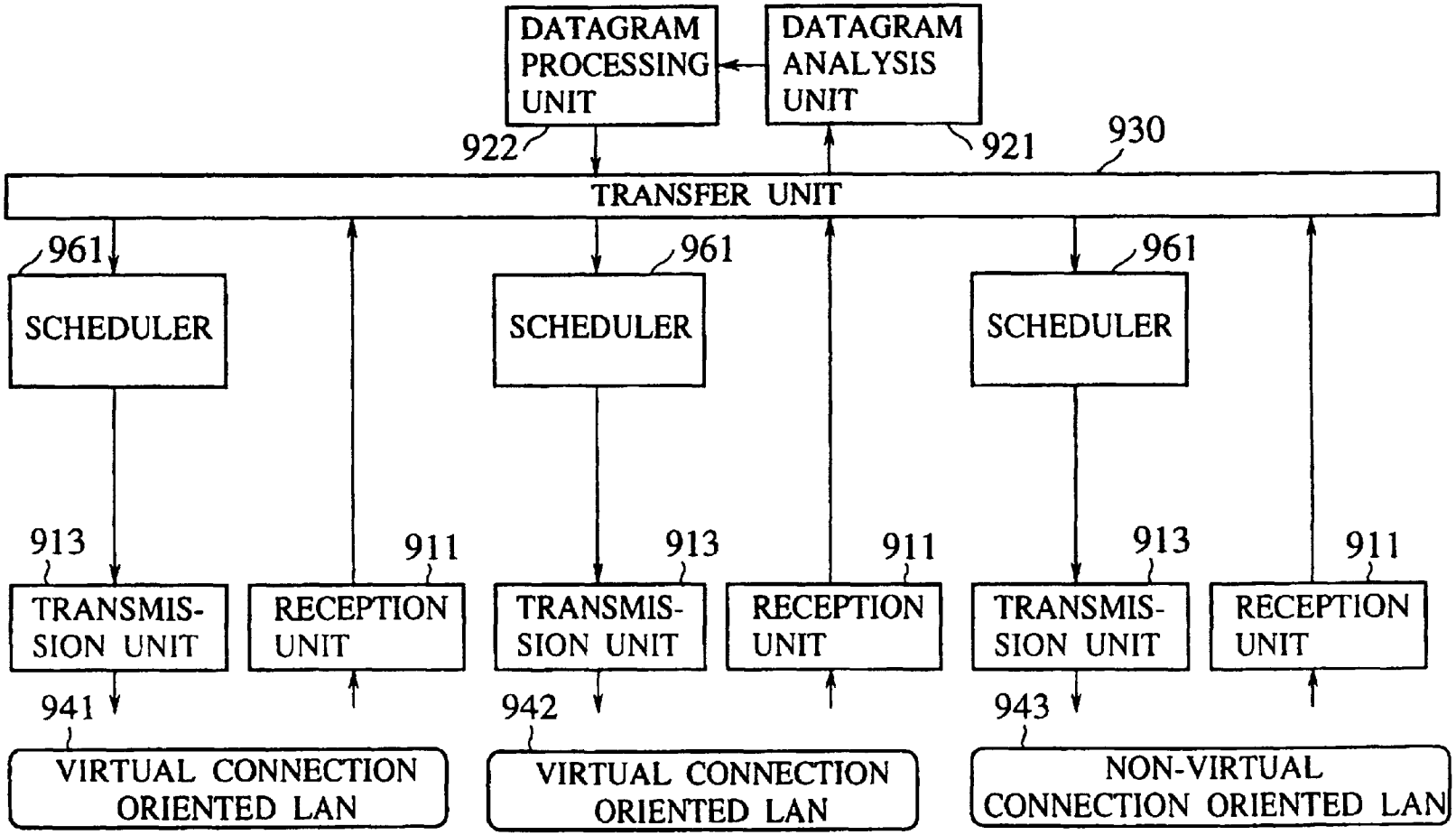
FIG.2 PRIOR ART
FIG. 2 is a schematic block diagram of another conventional router device.

Now, various embodiments of a router device and a datagram transfer method according to the present invention will be described with references to the drawings.

First, a prerequisite concerning a data communication network system will be described.

In short, the present invention carries out the datagram transfer at a router device by referring to a virtual connection identifier of a received datalink frame, instead of the datagram transfer based on a network layer address of a transfer target that can be obtained by referring to datagram content extracted from a received datalink frame.

In order to make it possible to determine a transfer target of the datagram according to a virtual connection identifier of a received datalink frame, it is necessary to make each datagram transmission node to transmit a specific type of datagrams only through specific virtual connections, such that only a specific type of datagrams are transmitted through these specific virtual connections.

Here, a specific type of datagrams can be any of the following three types of datagrams according to the need:

Type I: Datagrams destined to a specific destination;

Type II: Datagrams with a specific QOS (Quality Of Service); and

Type III: Datagrams of a specific protocol type or a specific protocol version.

Type I datagrams destined to a specific destination can include those datagrams which have an identical destination address, or those datagrams which have an identical value for a logical product of a destination address and a mask, for example.

Type II datagrams with a specific QOS can include those datagrams which have identical values for one or more of the following QOS specifying information, for example.

(1) Protocol type (such as IP, IPX)

(2) IP version (such as IPv4, IPv6)

(3) Protocol identifier (such as TCP, UDP)

(4) Destination address (5) Logical product of destination address and mask (6) Destination transport layer port (7) Source address (8) Logical product of source address and mask (9) Source transport layer port

(10) Stream ID for ST-2 (in a case of IPv5)

(11) Flow ID (in a case of IPv6)

(12) TOS (Type Of Service) (in a case of IPv4)

(13) Traffic class (in a case of IPv6)

Note that each of the above QOS specifying informations (9) to (13) is an information usually used to define QOS, while each of the above QOS specifying informations (1) to (8) is an information that can be used as an indication of QOS.

For example, in a case of using the QOS specifying information (1), datagrams of the protocol type IP can be associated with a particular QOS so that they can form one specific type of datagrams to be transmitted only through some specific virtual connections, while datagrams of the protocol IPX can be associated with another particular QOS so that they can form another specific type of datagrams to be transmitted only through some other specific virtual connections.

Similarly, in a case of using the QOS specifying information (4), datagrams destined to one particular destination can be associated with a particular QOS so that they can form one specific type of datagrams to be transmitted only through some specific virtual connections, while datagrams destined to any other destinations can be associated with another particular QOS so that they can form another specific type of datagrams to be transmitted only through some other specific virtual connections.

Type III datagrams of a specific protocol type or a specific protocol version can include those datagrams which have an identical protocol type such as IP or IPX, or those datagrams which have an identical IP version such as IPv4 or IPv6, for example.

Figure 3:
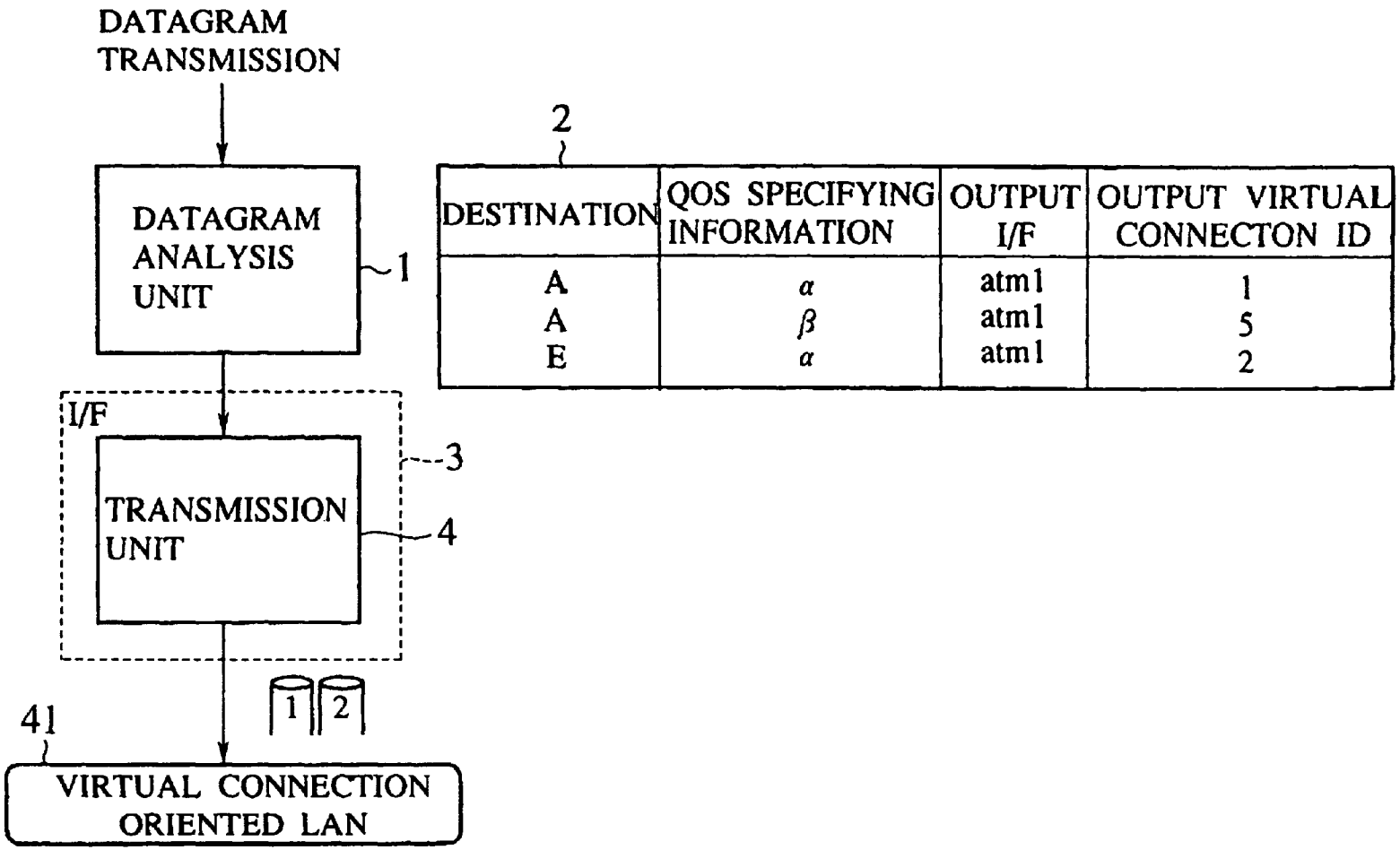
FIG. 3 is a schematic block diagram of a transmission node in the data communication network system used for the present invention.

In order to transmit a specific type of datagrams only through specific virtual connections, it is possible to use a transmission node having a configuration as shown in FIG. 3, which comprises a datagram analysis unit 1 having a routing table 2, and an interface (I/F) 3 having a transmission unit 4 connected between the datagram analysis unit 1 and a virtual connection oriented LAN 41. Note that FIG. 3 shows an exemplary case of classifying datagrams according to their destinations and QOSs, so that the routing table 2 shown in FIG. 3 has a field for a destination and a field for a QOS specifying information along with fields for an output I/F and an output virtual connection identifier, but a field for a destination or a field for a QOS specifying information may be omitted if unnecessary, and a QOS specifying information can be given by any one or more of QOS specifying information (1) to (13) enumerated above so as to realize any desired classification of datagrams. Note also that FIG. 3 shows only one I/F 3 for the sake of simplicity, but the transmission node may actually have as many I/Fs as necessary.

Here, a procedure for this transmission node of FIG. 1 to output datagram according to its destination will be described.

For example, in a case of transmitting a datagram to a destination A, the datagram analysis unit 1 refers to the routing table 2 which registers a correspondence among the destination, the output I/F, and the output virtual connection identifier, by using the destination A as a key, and determines that, for this datagram to the destination A, the output I/F is "atm1" and the output virtual connection is a virtual connection with a virtual connection identifier "1". Accordingly, the datagram analysis unit 1 sends this datagram to the I/F 3 corresponding to "atm1". Then, the transmission unit 4 of this I/F 3 assembles an AAL frame which is the datalink frame from the received datagram, divides the assembled AAL frame into ATM cells, and outputs the ATM cells to the virtual connection with a virtual connection identifier "1" in the virtual connection oriented LAN 41.

Note that the datagram analysis unit 1 searches through the routing table 2 by using "destination" as a key in the above description, but it is also possible to provide a routing table which can be searched through by using other information such as "quality of service" or "source address" as a key.

In the following description of the various embodiments of a router device according to the present invention, it is assumed that a data communication network system uses transmission nodes of a type shown in FIG. 3 described above, so that a specific type of datagrams are transmitted only through specific virtual connections.

Also, in the following, the virtual connection oriented network can be a network in which nodes are connected through ATM switches, or a network in which nodes are connected through point-to-point links without using ATM switches.

Also, in the following, the networks to which the interfaces are connected can be physical networks, or logical networks. In the latter case, the logical networks may belong to a single physical network, or a plurality of physical networks.

Also, in the following, the interface is not necessarily limited to a physical interface, and may include an interface function realized on CPU by means of software.

Now, with references to FIG. 4 to FIG. 9, the first embodiment of a router device according to the present invention will be described in detail.

In the following description of this first embodiment, it is supposed that the router device is connected with two virtual connection oriented LANs 41 and 42 as well as one non-virtual connection oriented LAN 43 for the sake of definiteness. Here, the virtual connection oriented LAN is assumed to be an ATM-LAN and the non-virtual connection oriented LAN is assumed to be an Ethernet for the sake of explanation.

Figure 4:
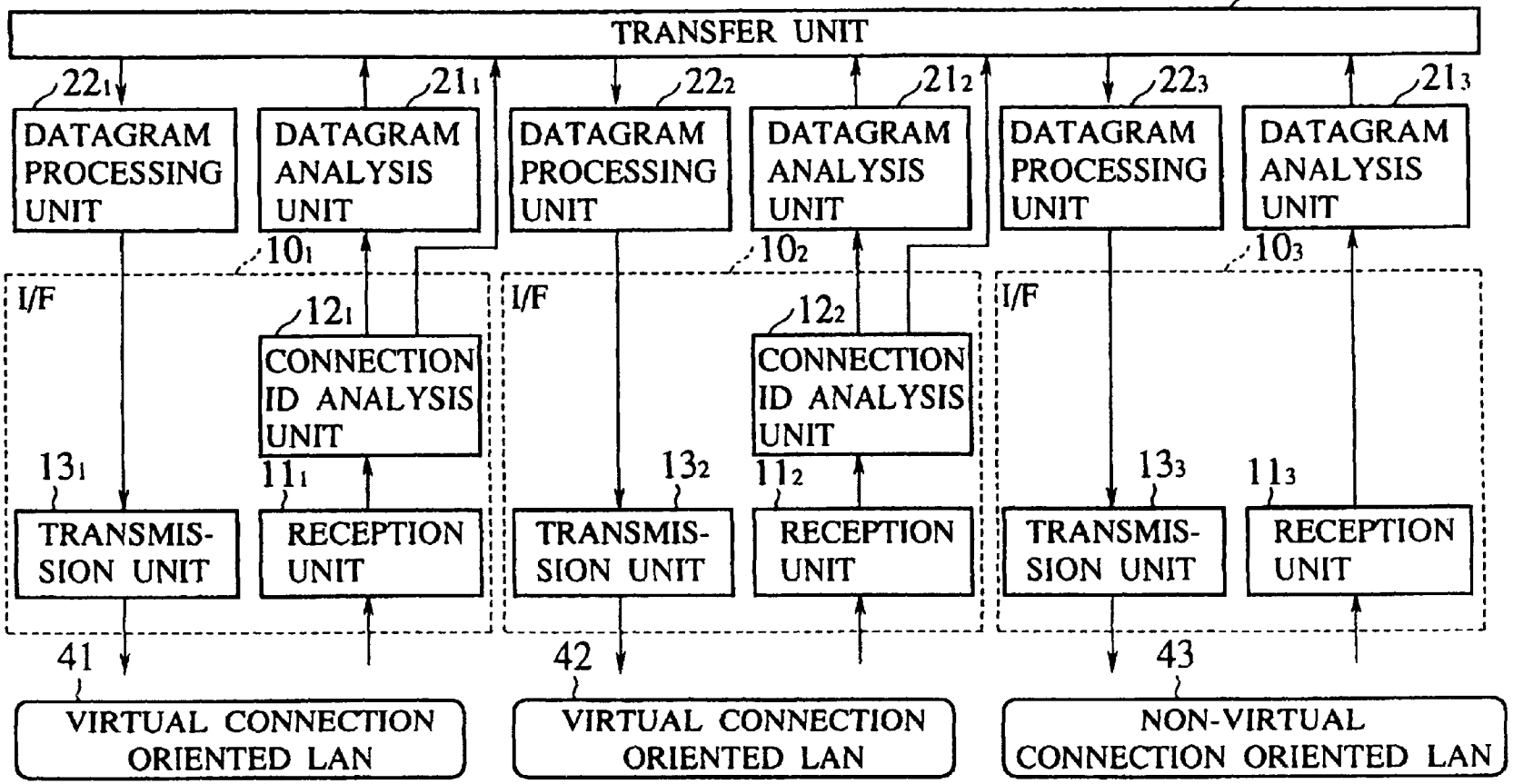
FIG. 4 is a block diagram of a router device in the first embodiment of the present invention.

As shown in FIG. 4, the router device of this first embodiment has an interface (I/F) 10 including a reception unit 11 and a transmission unit 13, a datagram analysis unit 21 connected with the reception unit 11, and a datagram processing unit 22 connected with the transmission unit 13, all in correspondence to each LAN connected to this router device. In addition, the interface 10 connected to the virtual connection oriented LAN 41 or 42 further includes a connection identifier analysis unit 12 connected between the reception unit 11 and the datagram analysis unit 21. The router device also has a transfer unit 30 connected with each datagram analysis unit 21, each datagram processing unit 22, and each connection identifier analysis unit 12, so as to mutually connect sections corresponding to different LANs. In the figure, subscripts attached to the reference numeral are used to distinguish similar elements provided in correspondence to different LANs.

In the following description of this first embodiment, the network protocol for transferring the datagram is assumed to be IP (Internet Protocol) for the sake of definiteness, although the present invention is equally applicable to any network protocol other than IP such as IPX.

The reception unit 11 receives the datalink frame from a connected LAN, and applies a processing appropriate for that LAN.

In a case of the Ethernet LAN, the reception unit 11 extracts the datalink frame destined to itself, and applies a CRC check for detecting errors in the datalink frame. Then, the reception unit 11 constructs the datagram from the datalink frame and determines which network protocol is to be used according to the datalink frame. Then, the constructed datagram and the received virtual connection identifier are given to the connection identifier analysis unit 12.

On the other hand, in a case of the ATM-LAN, the reception unit 11 detects errors in the ATM cells, assembles the AAL frame, carries out the error detection, determines which network protocol is to be used, and constructs the datagram. Then, the constructed datagram and the received VPI/VCI are given to the connection identifier analysis unit 12.

The datagram analysis unit 21 determines an output interface and a network layer address of a next hop node by referring to datagram content (including a header information such as a source address, a destination address, a flow ID, and TOS, and an upper layer information such as a port address). In order to realize this function, the datagram analysis unit 21 is provided with a routing table 210 as shown in FIG. 5, which registers the output interface and the next hop network layer address in correspondence to each datagram destination address. In this routing table 210, the output virtual connection identifier is registered instead of the next hop network layer address when the output interface is the virtual connection oriented LAN.

In the routing table 210 shown in FIG. 5, in order to explain both a case in which the next hop network layer address is registered in the routing table 210 and a case in which the output virtual connection identifier is registered in the routing table 210, the routing table 210 registers the next hop network layer address when the output interface is the non-virtual connection oriented LAN, or the output virtual connection identifier when the output interface is the virtual connection oriented LAN.

The datagram analysis unit 21 gives the datagram to the datagram processing unit 22 connected with the output interface determined according to this routing table 210, via the transfer unit 30.

Note that the routing table 210 shown in FIG. 5 is to be referred by using only the destination address as a key, but it is also possible to provide a routing table which can be searched through by using other datagram content as enumerated above as a key.

The connection identifier analysis unit 12 is provided only in the interface 10 connected with the virtual connection oriented LAN. Unlike the datagram analysis unit 21 which determined the output interface from the datagram content, the connection identifier analysis unit 12 determines the output interface by referring to the virtual connection identifier of the received datalink frame rather than the datagram content. In addition, the next hop network layer address or the output virtual connection identifier may also be determined by the connection identifier analysis unit 12. In order to realize this function, the connection identifier analysis unit 12 is provided with a transfer table 120 as shown in FIG. 6, which registers the output interface and the next hop network layer address in correspondence to each input connection identifier. In this transfer table 120, the output virtual connection identifier is registered instead of the next hop network layer address when the output interface is the virtual connection oriented LAN.

This transfer table 120 may be prepared manually, or automatically by means of a protocol with respect to the transmission node. This transfer table 120 can be constructed automatically by exchanging the virtual connection identifier and a type (such as a destination network layer address or a transport layer port) of datagram conveyed by that virtual connection between this router device and neighboring nodes.

The connection identifier analysis unit 12 determines whether the datagram should be sent to the datagram analysis unit 21 or to the datagram processing unit 22 of the interface 10 for transmitting this datagram via the transfer unit 30, according to this transfer table 120. Namely, the datagram received via the connection registered in this transfer table 120 will be given to the datagram processing unit 22 belonging to the corresponding output interface. On the other hand, a datalink frame which has a connection identifier not registered in this transfer table 120 or a datagram which has description indicating that is it to be given to the datagram analysis unit 21 will be given to the datagram analysis unit 21 so as to refer to its datagram content there.

The transfer unit 30 receives the datagram from the datagram analysis unit 21 or the connection identifier analysis unit 12, and gives that datagram to the datagram processing unit 22 belonging to the specified output interface. At this point, in addition to the datagram itself, the next hop network layer address or the output virtual connection identifier searched out from the routing table 210 of the datagram analysis unit 21 or the transfer table 120 of the connection identifier analysis unit 12 is also given to the datagram processing unit 22. This transfer unit 30 can be constructed from a bus or a switch, for example.

The datagram processing unit 22 carries out a processing to rewrite a header of the datagram (including a processing to reduce TTL (Time To Live), a checksum calculation, an optional processing, etc. in a case of IP). Also, when the datagram is larger than a maximum frame length of the LAN, the datagram processing unit 22 divides the datagram into parts which fit to the maximum frame length of the LAN. The actual processing contents of these processings may differ depending on which network protocol is used.

The transmission unit 13 carries out the processing appropriate for a connected LAN, in order to transmit the datagram to that LAN. For example, in a case of the ATM-LAN, the datagram is changed to the datalink frame (AAL frame), divided into ATM cell sizes, and outputted by attaching the specified output connection identifier.

When the output virtual connection identifier is not specified in both the routing table 210 and the transfer table 120, the network layer address of the next hop node is specified at the routing table 210 or the transfer table 120. Then, the output virtual connection identifier is determined from the specified network layer address of the next hop node by referring to a table provided in the transmission unit 13, which registers a correspondence between the network layer address and the virtual connection identifier. The cells are then outputted to the LAN by using the output virtual connection identifier determined in this manner.

When the output virtual connection identifier is obtained from the routing table 210 or the transfer table 120, the ATM cells are constructed from the datagram and outputted to the LAN by using the obtained output virtual connection identifier.

Next, the datagram transfer operation in the router device of this first embodiment will be described with reference to FIG. 7.

Figure 7:
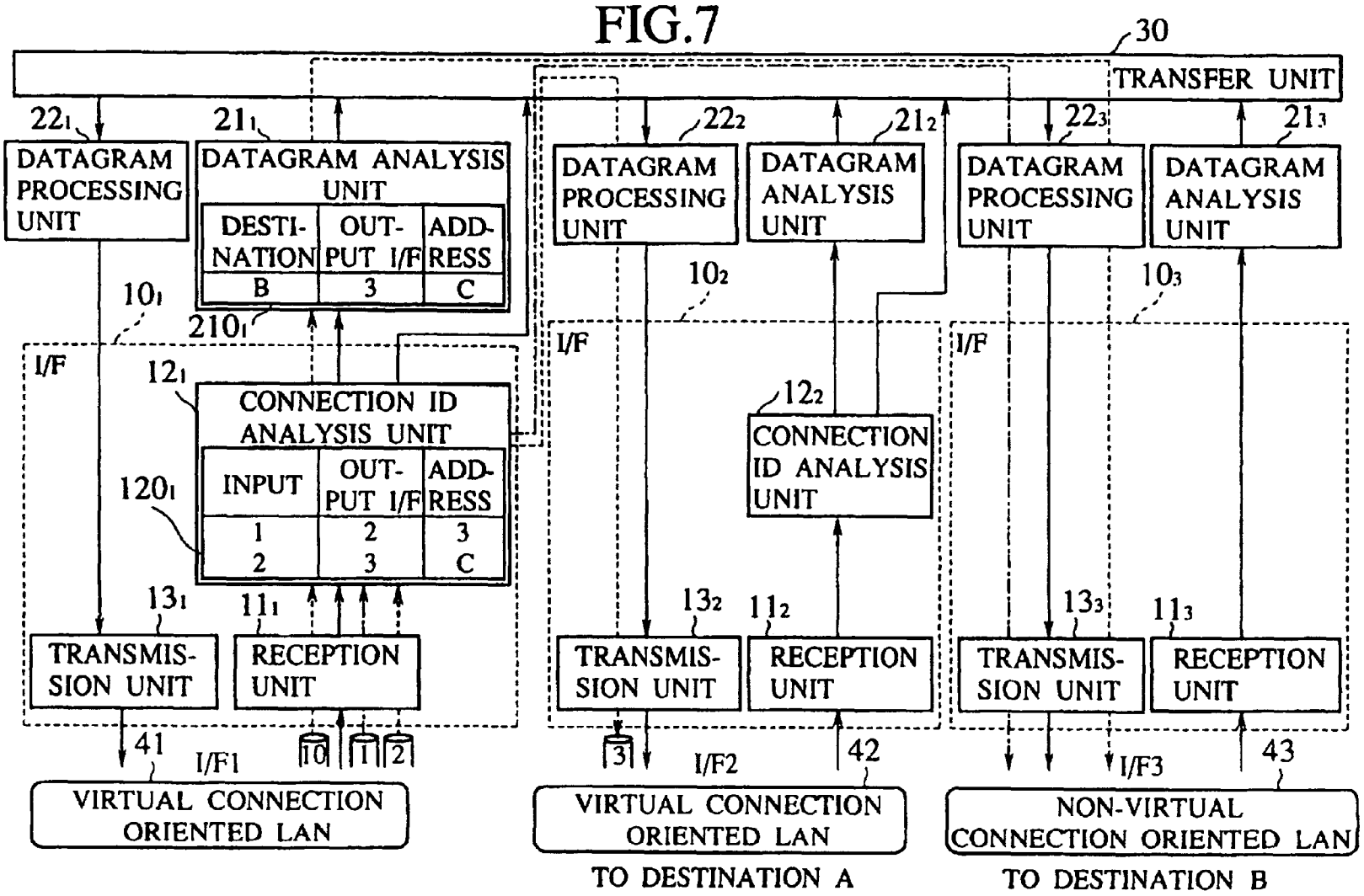
FIG. 7 is a block diagram showing an exemplary operation in the router device of FIG. 4.

Suppose now that I/F1 has three virtual connections (virtual connection-1, virtual connection-2, and virtual connection-10) set up and I/F2 has one virtual connection (virtual connection-3) set up as shown in FIG. 7, while the transfer table 120 of the connection identifier analysis unit 12 and the routing table 210 of the datagram analysis unit 21 for I/F1 are set up as shown in FIG. 7. These settings may be made manually, or automatically by means of a protocol, similarly as described above in conjunction with the transfer table 120 of the connection identifier analysis unit 12.

Also, suppose that the virtual connection-1 is set to transmit only datagrams destined to the destination A, and the virtual connection-2 is set to transmit only datagrams destined to the destination B. These settings can be realized by using the transmission node shown in FIG. 3 described above. The destination A is assumed to be located in a direction of I/F2, and the destination B is assumed to be located in a direction of I/F3. Note that the setting used here requires the transmission of only datagrams destined to one destination through one virtual connection, but it is also possible to use the setting which requires the transmission of only datagrams having identical source address and identical destination address through one virtual connection by means of the transmission node shown in FIG. 3 described above, for example, such that only a specific type of datagrams can be transmitted between the router device and its neighboring nodes.

Then suppose that the datagram is transmitted through the virtual connection-1. First, the reception unit 11 receives this datagram, and gives the received datagram and the virtual connection identifier of the virtual connection-1 to the connection identifier analysis unit $\mathbf{12}_1$.

The connection identifier analysis unit $\mathbf{12}_1$ can recognize that this datagram is a datagram entered from the virtual connection-1, so that the connection identifier analysis unit $\mathbf{12}_1$ refers to the transfer table $\mathbf{120}_1$ by using the input connection identifier "1" of the virtual connection-1 as a key. As a result, it can be determined that this datagram should be outputted to the virtual connection-3 of I/F2. In this manner, according this first embodiment, it is possible to determine the output target without referring to the datagram content.

When the output target is determined in this manner, this datagram and the output virtual connection identifier "3" of the virtual connection-3 as the output virtual connection identifier are given to the datagram processing unit $\mathbf{22}_2$ of I/F2 via the transfer unit 30. Then, after the network layer processing is applied at the datagram processing unit $\mathbf{22}_2$, this datagram is transmitted from the transmission unit $\mathbf{13}_2$ to the virtual connection-3 as determined from the transfer table $\mathbf{120}_1$. In this manner, the transfer from one virtual connection oriented LAN 41 to another virtual connection oriented LAN 42 can be completed.

If the network layer address of the next hop node rather than the output virtual connection identifier is given in the transfer table 120 of the connection identifier analysis unit 12, the transfer unit 30 gives the datagram and the network layer address of the next hop node to the datagram processing unit 22. Then, the datagram is given from the datagram processing unit 22 to the transmission unit 13 after the network layer processing is applied to the datagram at the datagram processing unit 22. The transmission unit 13 then determines the output virtual connection identifier from the network layer address of the next hop node, and transmits the datagram to the LAN.

Next, a case of transfer from the virtual connection oriented LAN to the non-virtual connection oriented LAN will be described.

Suppose here that the datagram is transmitted through the virtual connection-2 of I/F1. After this datagram is received at the reception unit $\mathbf{11}_1$, the connection identifier analysis unit $\mathbf{12}_1$ refers to the transfer table $\mathbf{120}_1$ by using the input connection identifier "2" of the virtual connection-2 as a key. As a result, it can be determined that this datagram should be outputted from the output I/F3 to the next hop network layer address C.

The connection identifier analysis unit $\mathbf{12}_1$ then gives this datagram and the network layer address C of the next hop node to the datagram processing unit $\mathbf{22}_3$ of I/F3 via the transfer unit 30. Then, after the network layer processing is applied at the datagram processing unit $\mathbf{22}_3$, this datagram and the network layer address C of the next hop node are given to the transmission unit $\mathbf{13}_3$. The transmission unit $\mathbf{13}_3$ then determines the datalink address from the network layer address of the next hop node, and transmits the datagram to the LAN.

In the above, the transfer target is determined by using the connection identifier, without referring to the datagram content, but it is also possible to use a conventional scheme here. Namely, when the transfer target cannot be determined from the connection identifier at the connection identifier analysis unit $\mathbf{12}_1$, the datagram can be given to the datagram analysis unit $\mathbf{21}_1$ so that the transfer target can be determined from the datagram content there.

For example, the datalink frame entered from the virtual connection-10 is received by the reception unit $\mathbf{11}_1$, and after being changed into the datagram there, the transfer table $\mathbf{120}^1$ is referred at the connection identifier analysis unit $\mathbf{12}_1$. In this case, the transfer table $\mathbf{120}_1$ has no corresponding entry registered, so that the datagram is given to the datagram analysis unit $\mathbf{21}_1$. Also, when the transfer table $\mathbf{120}_1$ has an indication that this datagram should be given to the datagram analysis unit $\mathbf{21}_1$, the datagram is given to the datagram analysis unit $\mathbf{21}_1$ similarly.

The datagram analysis unit $\mathbf{21}_1$ then refers to the datagram content, and recognizes that this datagram is destined to the destination B. Then, the datagram analysis unit $\mathbf{21}_1$ refers to the routing table $\mathbf{210}_1$ and recognizes that the datagram destined to the destination B should be outputted from I/F3 to the next hop network layer address C. Accordingly, the datagram and the network layer address C of the next hop node are given to the datagram processing unit $\mathbf{22}_3$ of I/F3 via the transfer unit 30, and then outputted from the transmission unit $\mathbf{13}_3$ to the non-virtual connection oriented LAN 43.

In this manner, it is possible for the router device to determine the destination address of the input datagram from the virtual connection identifier of the virtual connection through which the datagram is entered.

Consequently, an output interface and an address of a next hop router or an output virtual connection identifier in a case where an output target is a virtual connection network can be determined at the router device without looking into the datagram content, and therefore it is possible to improve the transfer efficiency at the router device.

Figure 8:
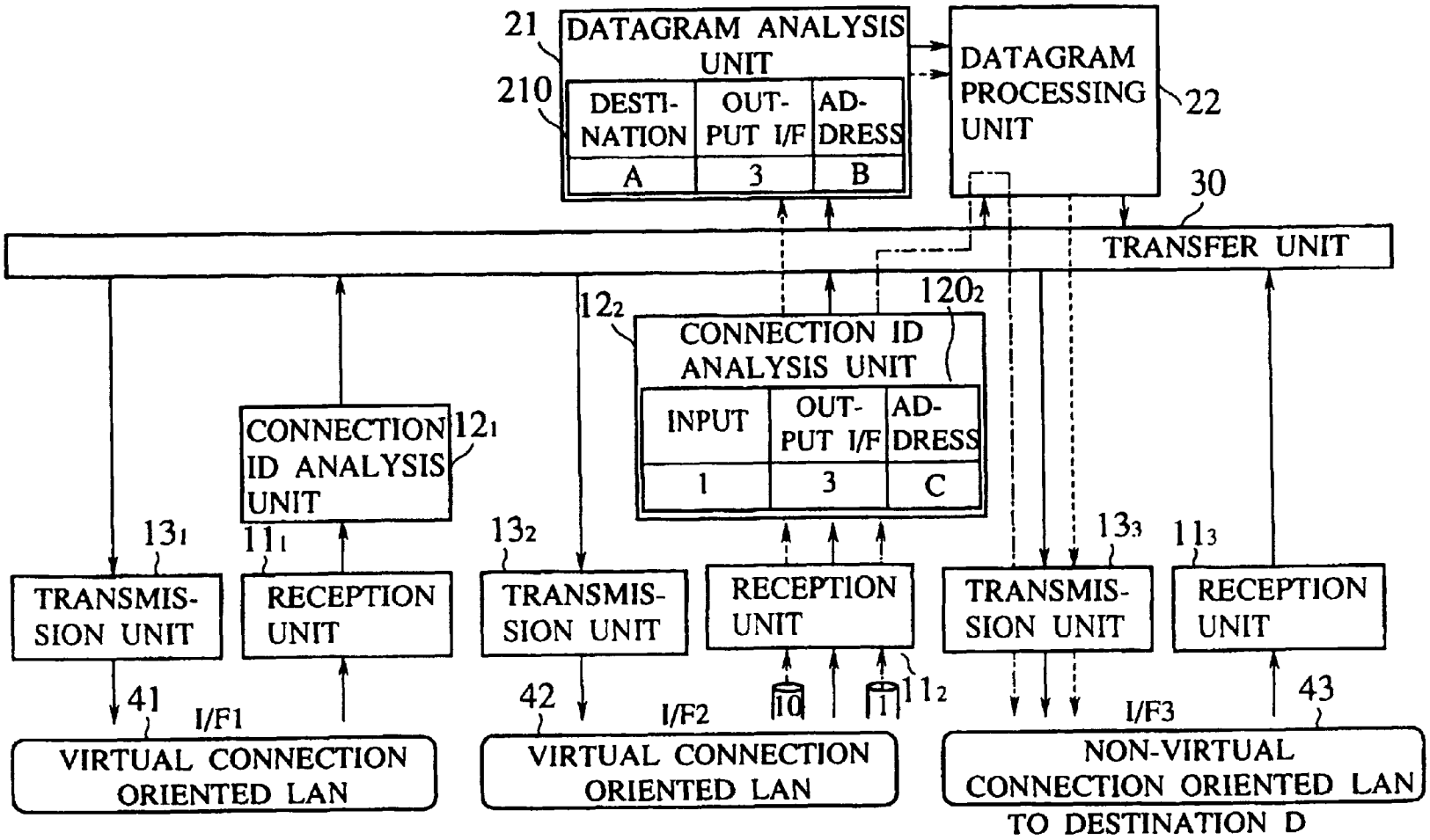
FIG. 8 is a block diagram of one modified configuration for the-router device in the first embodiment of the present invention.

It is to be noted that FIG. 4 shows an example in which the datagram analysis unit 21 and the datagram processing unit 22 are provided in correspondence to each interface 10, but a configuration of FIG. 4 can be modified to share a single set of the datagram analysis unit 21 and the datagram processing unit 22 among a plurality of interfaces 10, as shown in FIG. 8.

Here, a procedure for carrying out the datagram transfer in this router device of FIG. 8 will be described.

In this case, the detailed operation of each element in this router device of FIG. 8 is similar to that described above for the router device of FIG. 4.

Suppose now that the virtual connection-1 is set to transmit only datagrams destined to the destination D, and the virtual connection-10 is set to transmit various types of datagrams destined to different destinations. These settings can be realized by using the transmission node shown in FIG. 3 described above.

When the datalink frame is entered from the virtual connection-1, the reception unit $\mathbf{11}_2$ changes the received datalink frame into the datagram. Then, the transfer table $\mathbf{120}_2$ is referred at the connection identifier analysis unit $\mathbf{12}_2$ to determine that the datagram received from the virtual connection-1 should be outputted from I/F3 to the next hop network layer address C. After that, the datagram is given to the datagram processing unit 22 via the transfer unit 30, and then to the transmission unit $\mathbf{13}_3$ via the transfer unit 30, and outputted from there similarly as in an exemplary case of FIG. 7 described above.

On the other hand, when the datalink frame is received from the virtual connection-10, the reception unit $\mathbf{11}_2$ changes the received datalink frame into the datagram. Then, the transfer table $\mathbf{120}_2$ is referred at the connection identifier analysis unit $\mathbf{12}_2$. As a result, when it is confirmed that this virtual connection-10 is not registered in this transfer table $\mathbf{120}_2$, the datagram is given to the datagram analysis unit 21 via the transfer unit 30. Then, the datagram analysis unit 21 refers to the routing table 210 to determine that this datagram should be outputted from I/F3 to the next hop network layer address B. Then, similarly as in the above, the datagram is given to the datagram processing unit 22 via the transfer unit 30, and then to the transmission unit $\mathbf{13}_3$ via the transfer unit 30, and outputted from there.

Figure 9:
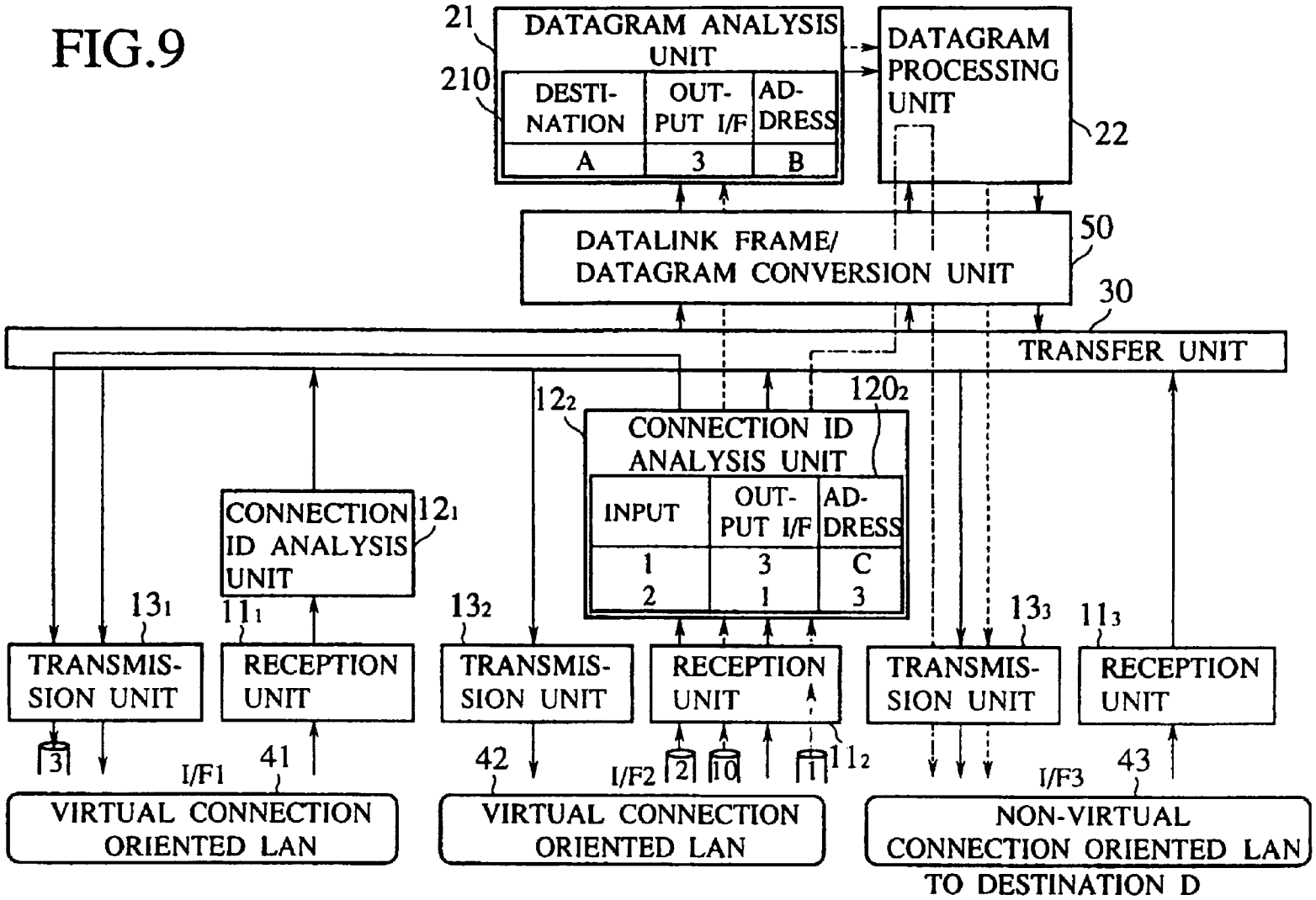
FIG. 9 is a block diagram of another modified configuration for the router device in the first embodiment of the present invention.

It is also to be noted that a configuration of FIG. 8 can be further modified as shown in FIG. 9. Namely, in this router device of FIG. 9, the function to change the datalink frame into the datagram and the function to change the datagram into the datalink frame are removed from the reception unit 11 and the transmission unit 13, respectively, and a datalink frame/datagram conversion unit 50 having these functions are additionally provided between the transfer unit 30 and the datagram analysis unit 21 and between the transfer unit 30 and the datagram processing unit 22.

In this case, the operation since the datalink frame is entered from the virtual connection-1 or the virtual connection-10 until it is transmitted from the transmission unit $\mathbf{13}_3$ is basically similar to that in a case of the router device of FIG. 8 described above, except for the operation of the datalink frame/datagram conversion unit 50 which takes place between the operations of the transfer unit 30 and the datagram analysis unit 21 and between the operation of the transfer unit 30 and the datagram processing unit 22.

In this modified configuration of FIG. 9, unlike a configuration of FIG. 8, there are cases in which the processings at the datagram analysis unit 21, the datagram processing unit 22, and the datalink frame/datagram conversion unit 50 can be omitted while transferring data.

For example, the datalink frame received from the virtual connection-2 of I/F2 is applied with the datalink layer processing such as the datalink checksum calculation at the reception unit. $\mathbf{11}_2$, and then the transfer table $\mathbf{120}_2$ is referred at the connection identifier analysis unit $\mathbf{12}_2$. As a result, it can be determined that this datalink frame should be outputted to the virtual connection-3 of I/F1. In this case, this datalink frame is then given to the transmission unit $\mathbf{13}_1$ via the transfer unit 30, and after the datalink layer processing is applied at the transmission unit $\mathbf{13}_1$, this datalink frame is outputted to the virtual connection oriented LAN 41, so that this datalink frame can be transferred without requiring the processings at the datagram analysis unit 21, the datagram processing unit 22, and the datalink frame/datagram conversion unit 50.

It is to be noted that, in the first embodiment described above, the transfer table 120 of the connection identifier analysis unit 12 is used for determining an output interface to which the datagram is to be transferred, but it is also possible to use the transfer table 120 of the connection identifier analysis unit 12 for determining an output virtual connection identifier corresponding to an input connection identifier, and transfer the datagram such that the datagram is outputted to a virtual connection having a virtual connection identifier identical to the determined output virtual connection identifier, in the similar manner as described above.

It is also to be noted that, in the first embodiment described above, the output interface and the network hop network layer address are searched out from the transfer table 120 of the connection identifier analysis unit 12 by using the input connection identifier as a key, but it is also possible to modify the above first embodiment such that the connection identifier analysis unit has a table for registering a correspondence between an input virtual connection identifier and a protocol type information indicating a type and/or a version of a protocol of the datagram, such that a protocol type and/or version can be searched out from this table of the connection identifier analysis unit by using the input connection identifier as a key.

In this case, the output interface cannot be determined by the connection identifier analysis unit, so that all the datagrams will be sent to the datagram analysis unit to determine their appropriate output interfaces. Here, however, the datagram analysis unit can recognize the protocol of the received datagram before the datagram content is referred by means of the operation by the connection identifier analysis unit.

In general, the datagram analysis unit can have a multiprocessor configuration formed by a plurality of processors, which are provided in correspondence to different protocols. In such a case, the datagram analysis unit can enter the received datagram into an appropriate processor corresponding to the protocol of that datagram, without referring to the datagram content, so that there is no need for an operation to classify the received datagrams according to their protocols at the datagram analysis unit.

For example, when the datagram analysis unit has one processor responsible for the datagram analysis and processing of datagrams of IP (or IPv6) and another processor responsible for the datagram analysis and processing of datagrams of IPX (or IPv4), the datagram entering into the datagram analysis unit can be appropriately entered into the corresponding processor according to the protocol type and/or version of the datagram determined by the connection identifier analysis unit according to the input connection identifier of the datagram.

Referring now to FIG. 10 to FIG. 13, the second embodiment of a router device according to the present invention will be described in detail.

Figure 10:
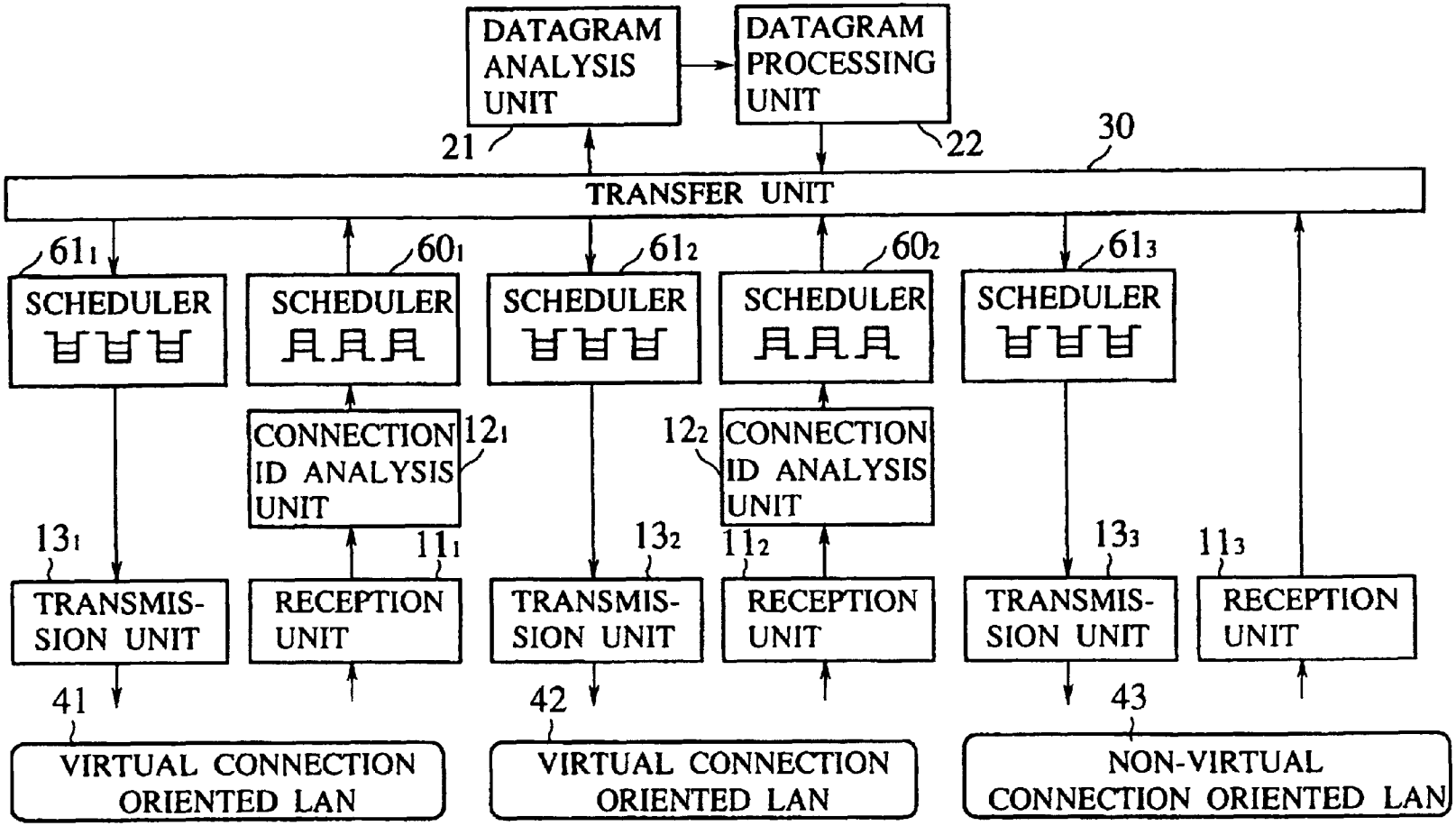
FIG. 10 is a block diagram of a router device in the second embodiment of the present invention.

In this second embodiment, the router device has a configuration as shown in FIG. 10, where the reception unit 11, the connection identifier analysis unit 12, the transmission unit 13, the datagram analysis unit 21, the datagram processing unit 22, and the transfer unit 30 are basically similar to those in the first embodiment described above, except that the connection identifier analysis unit 12 has a modified internal configuration as will be described below. Here, the datagram analysis unit 21 and the datagram processing unit 22 are shared among a plurality of interfaces similarly as in a configuration of FIG. 8 described above.

In addition, this router device of FIG. 10 has a scheduler 60 connected between the connection identifier analysis unit 12 and the transfer unit 30, and a scheduler connected between the transfer unit 30 and the transmission unit 13.

The router device of FIG. 10 is connected with two virtual connection oriented LANs 41 and 42 as well as one non-virtual connection oriented LAN 43 similarly as in the first embodiment described above.

This second embodiment differs from the first embodiment described above in the incorporation of the schedulers 60 and 61, and the internal configuration of the connection identifier analysis unit 12.

Each one of the schedulers 60 and 61 changes an output order of the datagrams according to the requested quality of service of each datagram, instead of outputting the datagrams in the received order. For example, the output order of the datagrams can be changed by separately storing the datagrams in buffers provided in correspondence to different levels of quality of service, and changing a rate of extracting the datagrams from each buffer according to the corresponding quality of service.

Figure 11:
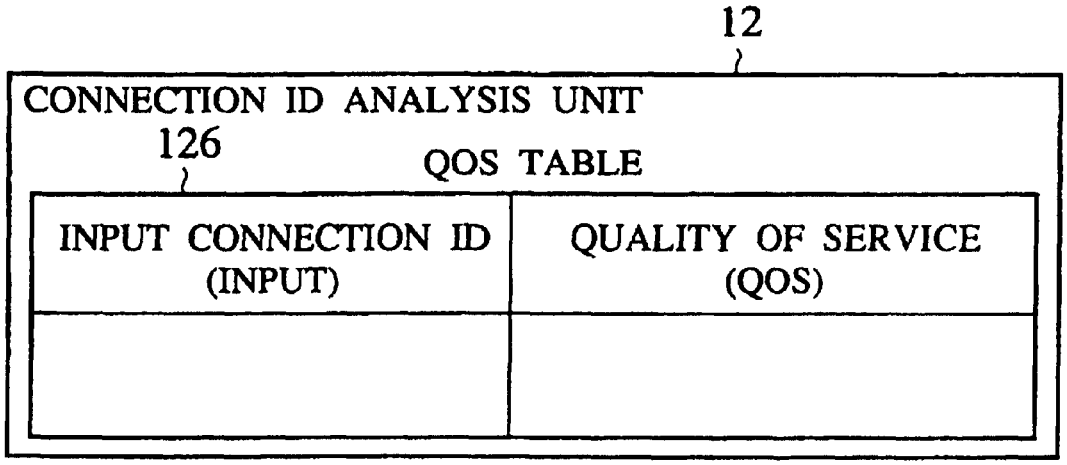
FIG. 11 is a diagram showing a QOS table in the connection identifier analysis unit of the router device of FIG. 10.

On the other hand, the connection identifier analysis unit 12 is provided with a QOS table 126 as shown in FIG. 11, which registers the quality of service (QOS) in correspondence to each input connection identifier, instead of the transfer table used in the first embodiment described above. By changing this QOS table 126, the information that can be determined from the input connection identifier can be changed.

Next, the datagram transfer operation in the router device of this second embodiment will be described with reference to FIG. 12.

Figure 12:
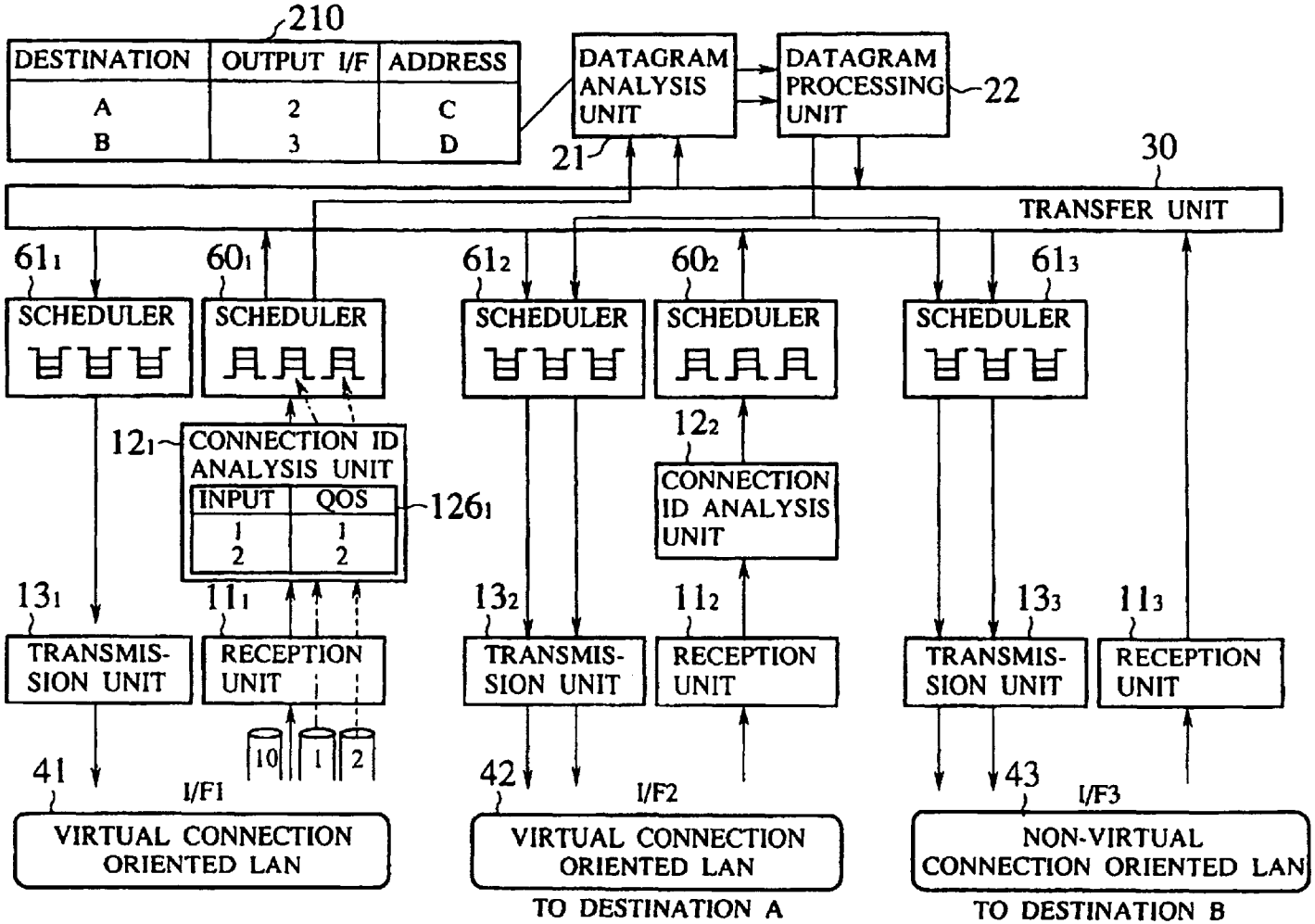
FIG. 12 is a block diagram showing an exemplary operation in the router device of FIG. 10.

Suppose now that I/F1 has three virtual connections (virtual connection-1, virtual connection-2, and virtual connection-10) set up as shown in FIG. 12, where the virtual connection-1 is set to transmit only datagrams of QOS-1, and the virtual connection-2 is set to transmit only datagrams of QOS-2. These settings can be realized by using the transmission node shown in FIG. 3 described above. Here, the QOS-1 is assumed to be in a higher priority level than the QOS-2.

Suppose also that the QOS table 126 of the connection identifier analysis unit 12 for I/F1 and the routing table 210 of the datagram analysis unit 21 are set up as shown in FIG. 12. The QOS table 126 shown in FIG. 12 indicates that the virtual connection-1 corresponds to the QOS-1, and the virtual connection-2 corresponds to the QOS-2. These settings may be made manually, or automatically by means of a protocol. This QOS table 126 can be constructed automatically by exchanging the virtual connection identifier and a quality of service of datagram conveyed by that virtual connection between this router device and neighboring nodes.

Then, when the datagram is received from the virtual connection-1, the reception unit $\mathbf{11}_1$ receives this datagram, and applies the datalink layer processing. After that, the connection identifier analysis unit $\mathbf{12}_1$, refers to the QOS table $\mathbf{126}_1$ i by using the input connection identifier "1" of the virtual connection-1 as a key. As a result, it can be determined that this datagram is of the QOS-1. In this manner, according this second embodiment, it is possible to determine the quality of service without referring to the datagram content.

Next, the scheduler $\mathbf{60}_1$ enters this datagram into a buffer-1 provided therein in correspondence to the QOS-1. The scheduler $\mathbf{60}_1$ extracts the datagrams from the buffers according to the priority order among the datagrams, and sends the datagrams to the datagram analysis unit 21 via the transfer unit 30. Here, an order of extracting can be set such that any datagrams of QOS-1 at a higher priority order existing in the buffers are extracted first, and any datagram of QOS-2 are extracted after that.

The datagram extracted from the buffers in the scheduler $\mathbf{60}_1$ is then given to the datagram analysis unit 21 to determine the output interface and the network layer address of the next hop node from the destination of the datagram by referring to the routing table 210, and then given to the datagram processing unit 22. After that, the datagram is given to the scheduler $\mathbf{61}_2$ of the output target, and then given to the transmission unit $\mathbf{13}_2$, and outputted from there to complete the transfer. Here, the datagram transfer from the scheduler $\mathbf{61}_2$ to the transmission unit $\mathbf{13}_2$ in the output interface is also carried out according to the priority order similarly as in a case of the scheduler 60, described above.

Similarly, the datagram entered from the virtual connection-2 is received by the reception unit $\mathbf{11}_1$, and determined that it is of the QOS-2 by referring to the QOS table $\mathbf{126}_1$ at the connection identifier analysis unit $\mathbf{12}_1$. Then, this datagram is entered into a buffer provided in correspondence to the QOS-2 at the scheduler $\mathbf{60}_1$, and thereafter processed similarly as the datagram of QOS-1 described above.

As for the datagram entered from the virtual connection-10, the QOS table $\mathbf{126}_1$ of the connection identifier analysis unit $\mathbf{12}_1$ does not register a corresponding virtual connection identifier, so that this datagram is entered into a buffer provided in correspondence to the lowest priority order at the scheduler $\mathbf{60}_1$, and thereafter processed similarly as the datagram of QOS-1 described above.

In this manner, it is possible for the router device to determine the QOS class of the input datagram from the virtual connection identifier of the virtual connection through which the datagram is entered. Consequently, the datagrams can be classified according to their QOS classes at the router device without looking into the datagram content. By means of this, at a time of datagram scheduling at an input stage, it becomes possible to realize the scheduling according to the QOS classes even if the processings of the transfer unit 30, the datagram analysis unit 21, and the datagram processing unit 22 are slow.

Figure 13:
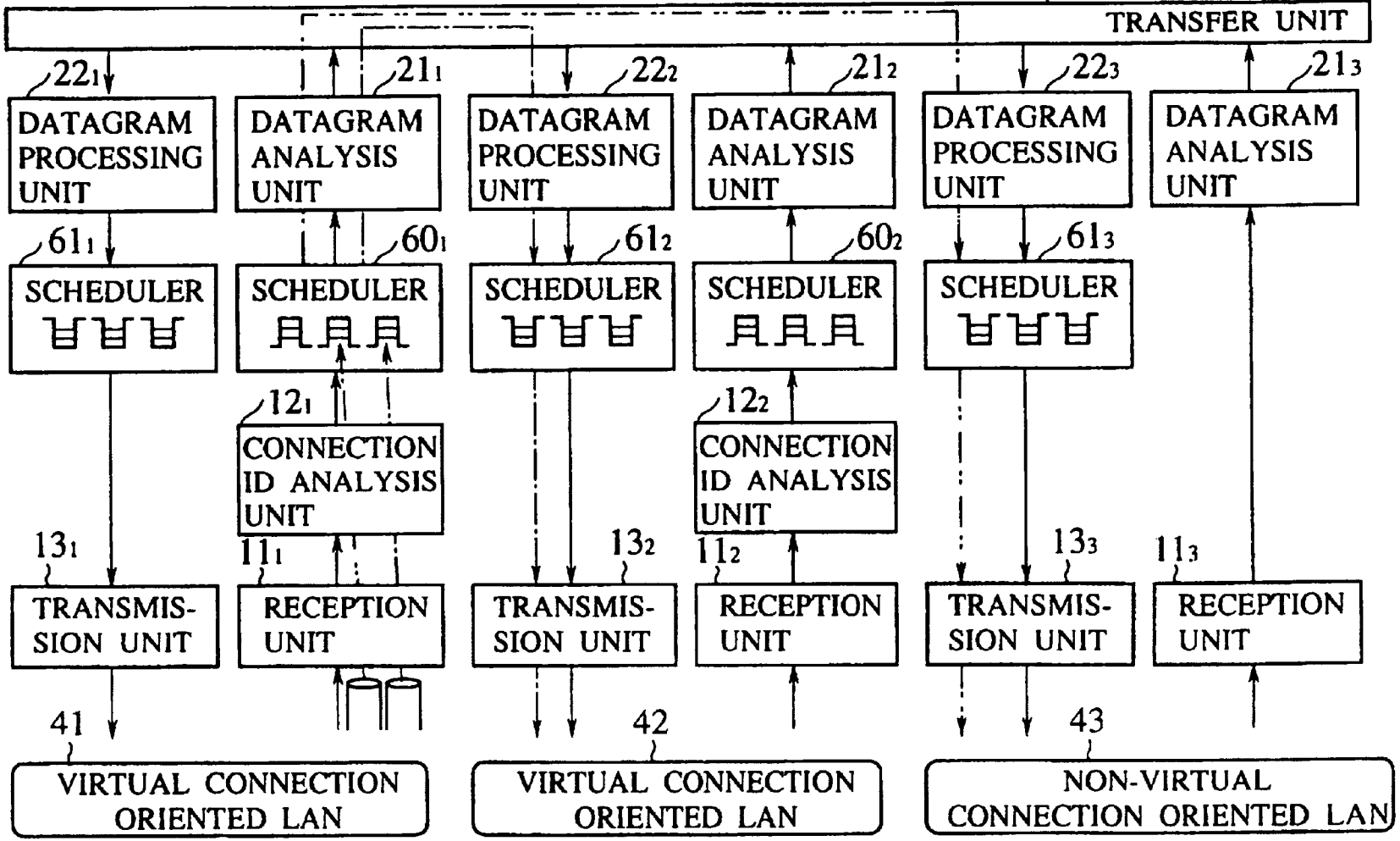
FIG. 13 is a block diagram of one modified configuration for the router device in the second embodiment of the present invention.

It is to be noted that a configuration of FIG. 10 can be modified to incorporate the datagram analysis unit 21 and the datagram processing unit 22 for each interface separately as shown in FIG. 13. In this modified configuration of FIG. 13, the received datalink frame is applied with the datalink layer processing at the reception unit 11, and the quality of service is determined from the QOS table 126 at the connection identifier analysis unit 12, and the datagram is given to the scheduler 60 according to the determined quality of service, similarly as in a case of FIG. 12 described above.

In this modified configuration of FIG. 13, however, the datagram outputted from the scheduler 60 is given to the datagram analysis unit 21 and the output interface and the network layer address of the next hop node or the output virtual connection identifier are determined from the destination address of the datagram there. After that, the datagram is transferred to the datagram processing unit 22 of the output interface via the transfer unit 30, and then given to the scheduler 61 and outputted from the transmission unit 13 in the output interface. Here, the datagram transfer from the scheduler 61 to the transmission unit 13 in the output interface is also carried out according to the priority order similarly as in a case of the scheduler 60 described above.

Figure 14:
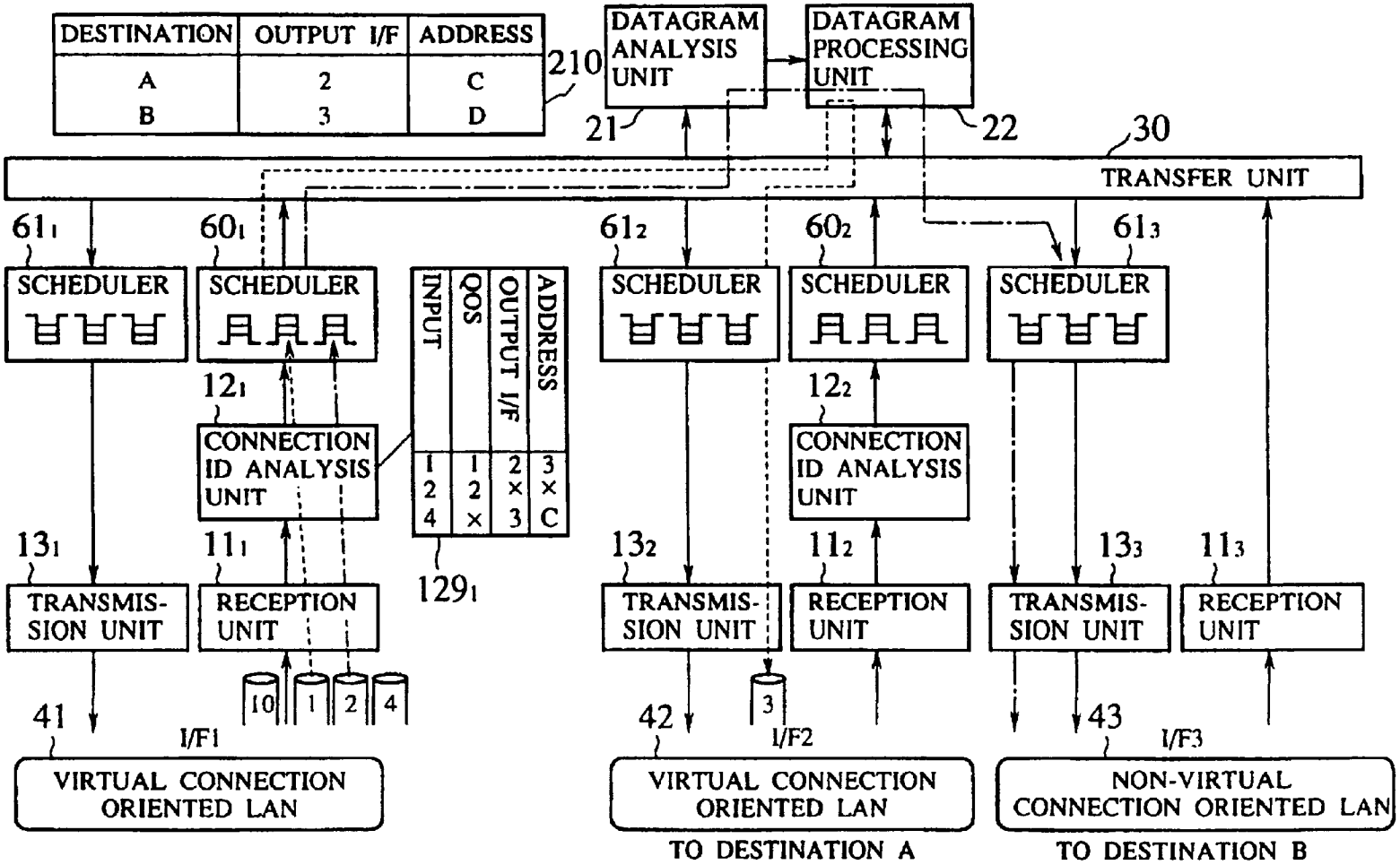
FIG. 14 is a block diagram of a router device in the third embodiment of the present invention.
Figure 15:
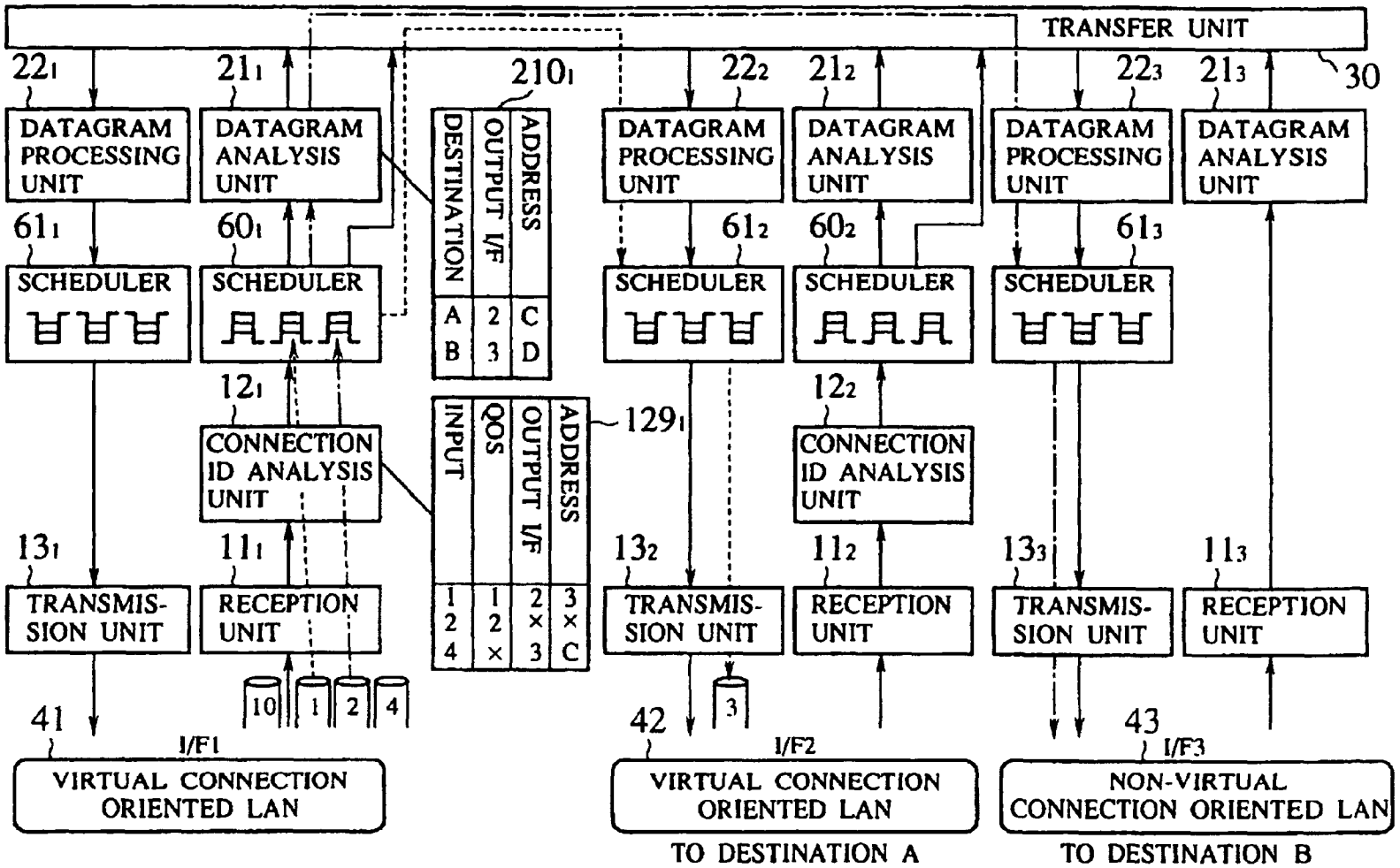
FIG. 15 is a block diagram of one modified configuration for the router device in the third embodiment of the present invention.

Referring now to FIG. 14 and FIG. 15, the third embodiment of a router device according to the present invention will be described in detail.

This third embodiment is a combination of the first and second embodiments described above, in which both the transfer target and the quality of service can be determined without referring to the datagram content.

In this third embodiment, the router device has a configuration as shown in FIG. 14, where the reception unit 11, the connection identifier analysis unit 12, the transmission unit 13, the datagram analysis unit 21, the datagram processing unit 22, the transfer unit 30, and the schedulers 60 and 61 are basically similar to those in the second embodiment described above, except that the connection identifier analysis unit 12 has a modified internal configuration as will be described below. Here, the datagram analysis unit 21 and the datagram processing unit 22 are shared among a plurality of interfaces similarly as in a configuration of FIG. 8 described above.

This router device of FIG. 14 is connected with two virtual connection oriented LANs 41 and 42 as well as one non-virtual connection oriented LAN 43 similarly as in the first and second embodiments described above.

The connection identifier analysis unit 12 is provided with a transfer table 129 as shown in FIG. 14, which registers the quality of service (QOS), the output interface (output I/F), and the next hop network layer address or the output virtual connection identifier (address) in correspondence to each input connection identifier (input), so that this transfer table 129 combines the transfer table 120 of the first embodiment and the QOS table 126 of the second embodiment.

Next, the datagram transfer operation in the router device of this third embodiment will be described with reference to FIG. 14.

Suppose now that I/F1 has the virtual connection-1 which is set to transmit only datagrams of QOS-1 destined to the destination A, and the virtual connection-2 which is set to transmit only datagrams of QOS-2. These settings can be realized by using the transmission node shown in FIG. 3 described above. Here, the QOS-1 is assumed to be in a higher priority level than the QOS-2.

Suppose also that the transfer table 129 of the connection identifier analysis unit 12 for I/F1 and the routing table 210 of the datagram analysis unit 21 are set up as shown in FIG. 14.

Then, when the datagram is received from the virtual connection-1 at the reception unit 11, of I/F1, the datalink layer processing is applied to this datagram there, and this datagram is given to the connection identifier analysis unit $\mathbf{12}_1$. Then, the connection identifier analysis unit $\mathbf{12}_1$ refers to the transfer table $\mathbf{129}_1$ by using the input connection identifier "1" of the virtual connection-1 as a key. As a result, it can be determined that this datagram is of the QOS-1, for which the output interface is I/F2 and the output virtual connection is the virtual connection-3.

Next, this datagram is entered into a buffer-1 provided in correspondence to the QOS-1 in the scheduler $\mathbf{60}_1$ to receive the transfer order priority control by the the scheduler $\mathbf{60}_1$, and then given to the transfer unit 30 along with the output virtual connection identifier "3".

Then, this datagram is given to the datagram processing unit 22 and applied with the network layer processing there, and then given to the scheduler $\mathbf{61}_2$ of I/F2 via the transfer unit 30 to receive the transfer order priority control there. This datagram is then given to the transmission unit $\mathbf{13}_2$, and outputted to the virtual connection-3 from there.

In the above description, the datagram and the virtual connection identifier "3" are given from the scheduler 60 to the transfer unit 30, but the quality of service QOS-1 may also be given in addition to them for use in the priority control at the scheduler $\mathbf{61}_2$.

Similarly, the datagram entered from the virtual connection-2 is received by the reception unit $\mathbf{11}_1$, and given to the connection identifier analysis unit $\mathbf{12}_1$. Then, by referring to the transfer table $\mathbf{129}_1$ at the connection identifier analysis unit $\mathbf{12}_1$, it can be determined that this datagram is of the QOS-2 for which the output I/F and the address are not specified.

Consequently, this datagram is entered into a buffer provided in correspondence to the QOS-2 at the scheduler $\mathbf{60}_1$, and as the output I/F is not determined yet, this datagram is given to the datagram analysis unit 21 via the transfer unit 30. The datagram analysis unit 21 then refers to the destination of this datagram, and when it is recognized that this datagram is destined to the destination B, the routing table 210 is referred by using this destination B as a key, to determine that the output interface is I/F3 and the network layer address of the next hop node is D in this case.

Then, this datagram is given to the datagram processing unit $\mathbf{22}_3$ and applied with the network layer processing there, and then given to the scheduler $\mathbf{61}_3$ of I/F3 via the transfer unit 30 to receive the transfer order priority control there. Then, at the transmission unit $\mathbf{13}_3$, the datalink address is determined from the next hop network layer address, the datalink frame is constructed, and outputted to the LAN from there.

In this manner, it is possible for the router device to determine the destination address and the quality of service of the input datagram from the virtual connection identifier of the virtual connection through which the datagram is entered. Consequently, it is possible to improve the transfer efficiency at the router device considerably.

It is to be noted that a configuration of FIG. 14 can be modified to incorporate the datagram analysis unit 21 and the datagram processing unit 22 for each interface separately as shown in FIG. 15.

In this modified configuration of FIG. 15, the received datalink frame is applied with the datalink layer processing at the reception unit 11, and the destination address and the quality of service are determined from the transfer table 129 at the connection identifier analysis unit 12, and the datagram is given to the scheduler 60 according to the determined quality of service, similarly as in a case of FIG. 14 described above.

In this modified configuration of FIG. 15, however, the scheduler 60 determines whether the datagram should be given to the datagram analysis unit 21 or the transfer unit 30. When the virtual connection-1 is set to transmit only dataagrams of QOS-1 destined to the destination A, and the virtual connection-2 is set to transmit only datagrams of QOS-2 as in a case of FIG. 14, the output interface and the next hop network layer address or output virtual connection identifier can be determined from the transfer table 129 of the connection identifier analysis unit 12 for the datagram received from the virtual connection-1, so that this datagram and the next hop network layer address or output virtual connection identifier are given to the datagram processing unit 22 of the output interface via the transfer unit 30.

On the other hand, the output interface and the next hop network layer address or output virtual connection identifier cannot be determined from the transfer table 129 of the connection identifier analysis unit 12 for the datagram received from the virtual connection-2. For this reason, this datagram is given to the datagram analysis unit 21, and the routing table 210 is referred by using the destination of this datagram to determine the output interface and the next hop network layer address or output virtual connection identifier, and then this datagram is given to the datagram processing unit 22 of the output interface via the transfer unit 30.

It is also to be noted here that in the first to third embodiments described above, a number of the virtual connection oriented LANs and/or the non-virtual connection oriented LANs is arbitrary. In addition, the present invention may be applied to any type of LAN other than the ATM-LAN and Ethernet used in the above description.

Figure 16:
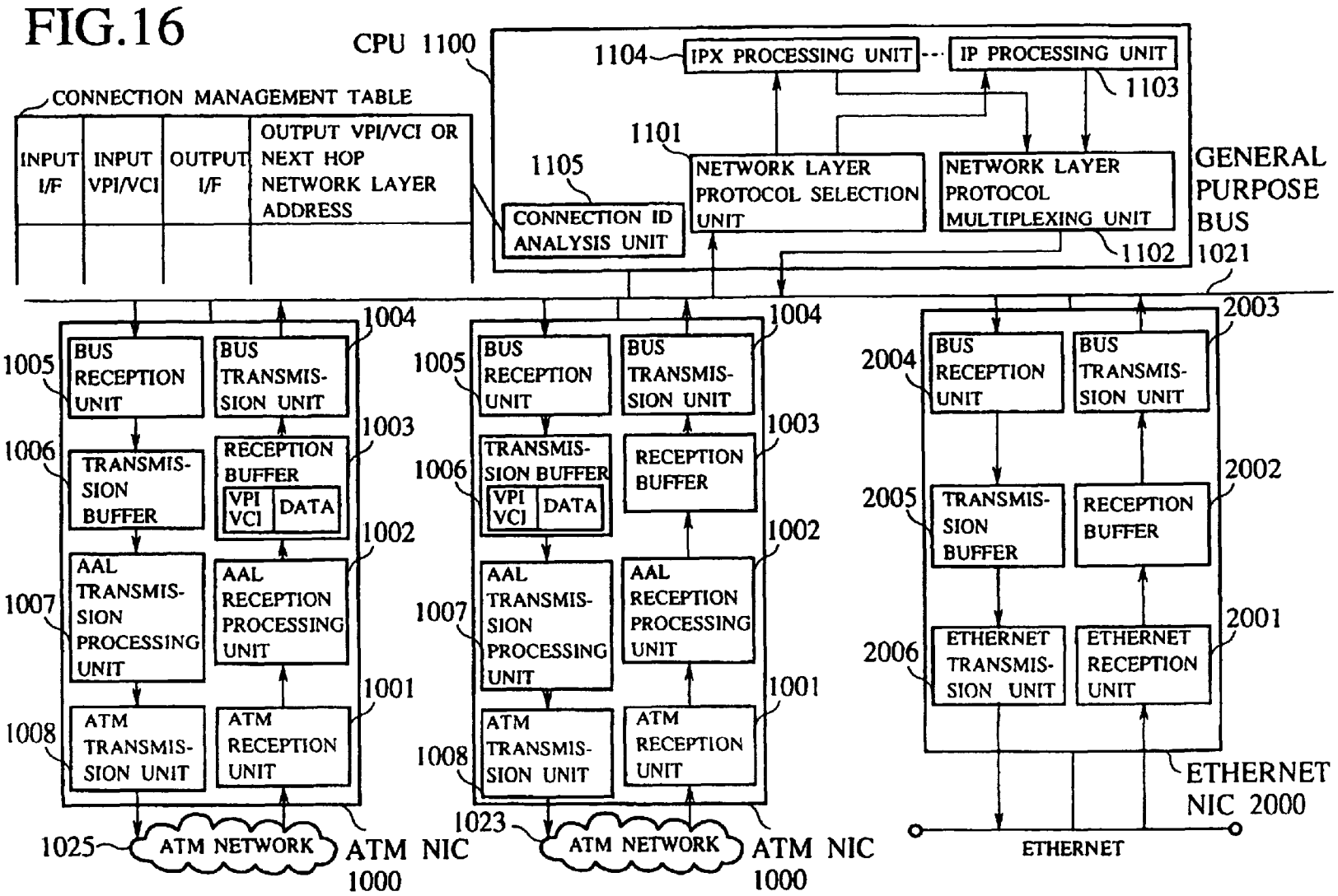
FIG. 16 is a block diagram of a router device in the fourth embodiment of the present invention.
Figure 17:
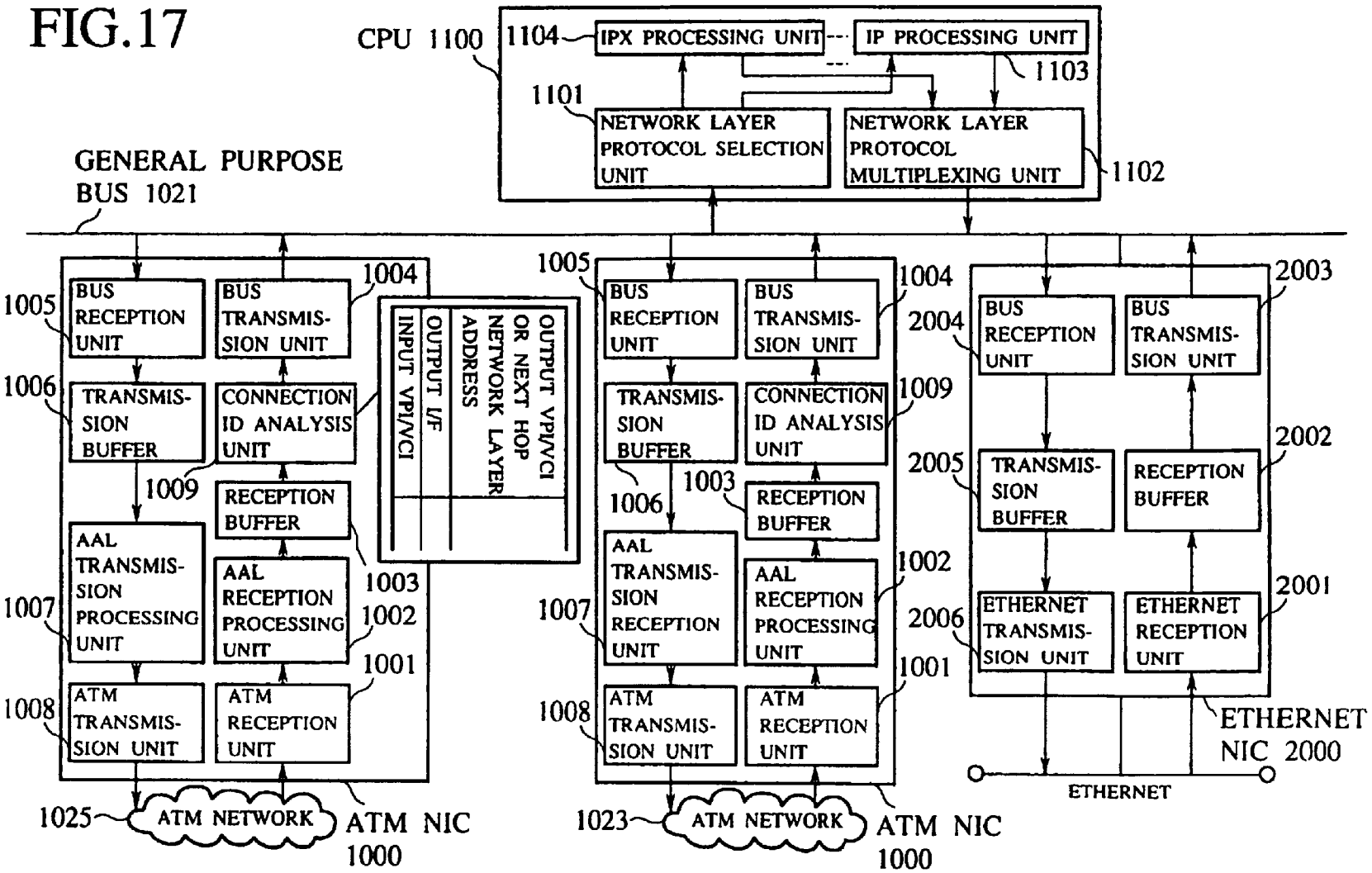
FIG. 17 is a block diagram of one modified configuration for the router device in the fourth embodiment of the present invention.
Figure 18:
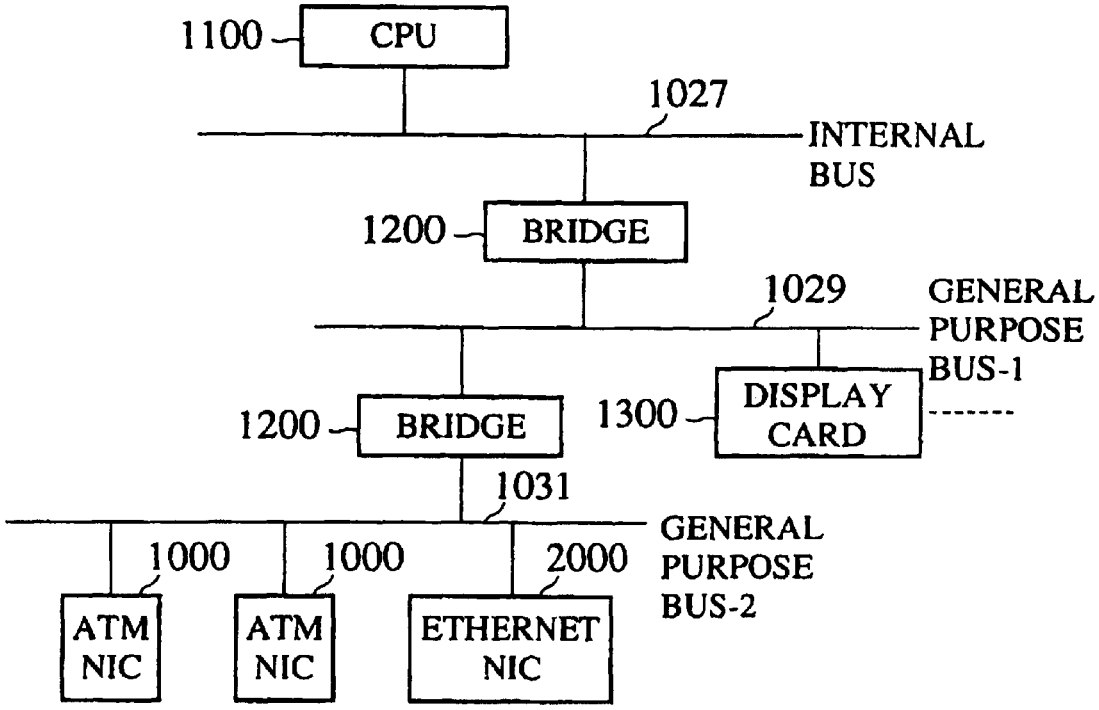
FIG. 18 is a schematic block diagram of another modified configuration for the router device in the fourth embodiment of the present invention.

Referring now to FIG. 16 to FIG. 18, the fourth embodiment of a router device according to the present invention will be described in detail.

This fourth embodiment concerns with a case of a router for connecting ATM networks, which is capable of determining the output interface and virtual connection identifier by using the input virtual connection identifier (VPI/VCI) without looking into the network layer datagram, and transferring the datagram as the AAL (ATM Adaptation Layer) frame (AAL PDU or AAL SDU).

In this fourth embodiment, the router device has a configuration as shown in FIG. 16, where a plurality of ATM NICs (Network Interface Cards) 1000 and a CPU board 1100 for carrying out the network layer processing are connected to a single general purpose bus 1021. In addition, the general purpose bus 1021 may also be connected with a non-virtual connection oriented NIC such as an Ethernet NIC 2000. Note that the general purpose bus 1021 may be replaced by a switch, if desired.

The CPU board 1100 carries out the network layer protocol processing by means of software processing, and includes a network layer protocol selection unit 1101 and a network layer protocol multiplexing unit 1102 each of which is connected with the general purpose bus 1021, an IP processing unit 1103 and an IPX processing unit 1104 each of which is connected with both the network layer protocol selection unit 1101 and the network layer protocol multiplexing unit 1102, and a connection identifier analysis unit 1105. Here, the connection identifier analysis unit 1105 has a connection management table for registering input VPI/VCI, output I/F, and output VPI/VCI or next hop network layer address in correspondence to input I/F as shown in FIG. 16.

The ATM NIC 1000 carries out the disassembly of the AAL frame into the ATM cells and the assembly of the AAL frame from the ATM cells, and includes an ATM reception unit 1001 connected with the ATM network 1023 or 1025, an AAL reception processing unit 1002 connected with the ATM reception unit 1001, a reception buffer 1003 connected with the AAL reception processing unit 1002, a bus transmission unit 1004 connected with the reception buffer 1003 and the general purpose bus 1021, a bus reception unit 1005 connected with the general purpose bus 1021, a transmission buffer 1006 connected with the bus reception unit 1005, an AAL transmission processing unit 1007 connected with the transmission buffer 1006, and an ATM transmission unit 1008 connected with the AAL transmission processing unit 1007 and the ATM network 1023 or 1025.

The Ethernet NIC 2000 includes an Ethernet reception unit 2001 connected with the Ethernet, a reception buffer 2002 connected with the Ethernet reception unit 2001, a bus transmission unit 2003 connected with the reception buffer 2002 and the general purpose bus 1021, a bus reception unit 2004 connected with the general purpose bus 1021, a transmission buffer 2005 connected with the bus reception unit 2004, and an Ethernet transmission unit 2006 connected with the transmission buffer 2005 and the Ethernet.

As for a transfer scheme between one ATM NIC and another ATM or non-virtual connection oriented NIC or CPU board, the following two schemes are available.

The first scheme presents the reception buffer 1003 and the transmission buffer 1006 of the ATM NIC 1000 as shared memories to the CPU such that they appear similarly as a memory possessed by the CPU. By means of this, the reading and writing between the ATM NIC 1000 and the CPU board 1100 can be realized by the CPU. The transfer between the ATM NICs can be realized as the CPU reads from one ATM NIC 1000 and writes into another ATM NIC 1000. The transfer between the ATM NIC and the Ethernet NIC can be realized similarly by replacing one ATM NIC 1000 in the above case with the Ethernet NIC 2000.

The second scheme realizes the data transfer in a form of reading from the ATM NIC 1000 to the CPU board 1100, or another ATM NIC 1000, or the Ethernet NIC 2000, by specifying a transfer target memory address, a data size, and an address of the reception buffer 1003 of the ATM NIC 1000, to the bus transmission unit 1004. In a case of writing into the ATM NIC 1000, the data are transferred to the transmission buffer 1006 by writing a transfer data size, a transmission source memory address, and a memory address of the transmission buffer 1006 of the transfer target ATM NIC 1000 in the bus transmission unit 1004. Also, by replacing the transfer target ATM NIC 1000 with the Ethernet NIC 2000, the transfer between the ATM NIC and the Ethernet NIC can be realized similarly.

In the following, a procedure for transferring cells received from the ATM network, either by carrying out the network layer processing or by keeping a form of the AAL frame, will be described.

In the ATM NIC 1000, the ATM cells are received from the ATM network at the ATM reception unit 1001, the received ATM cells are assembled into the AAL frame at the AAL reception processing unit 1002, and the obtained AAL PDU and the VPI/VCI of a connection through which the ATM cells are received are stored into the reception buffer 1003. When data are entered into the reception buffer 1003, the fact that data are received and the input interface are notified from the bus transmission unit 1004 to the CPU board 1100.

In the CPU board 1100, after the data reception is recognized, the input VPI/VCI is read out. Here, the input VPI/VCI may be notified from the ATM NIC 1000 to the CPU board 1100 at a time of notifying the data reception. Then, the connection identifier analysis unit 1105 in the CPU board 1100 determines the output interface and VPI/VCI or next hop network layer address from the input interface and VPI/VCI.

The processing from here on is different for a case of carrying out the network layer processing and a case of keeping a form of AAL frame (AAL transfer), so that these two cases will be described separately.

(1) A case of carrying out the network layer processing

When the output interface is the CPU board 1100 at the connection identifier analysis unit 1105, the AAL frame is transferred from the reception buffer 1003 of the ATM NIC 1000 to the network layer protocol selection unit 1101.

The network layer protocol selection unit 1101 removes a header/trailer of the data in the AAL frame according to a protocol type field in the AAL frame to covert the data into the datagrams, and gives the obtained datagrams to the corresponding network layer processing units (such as the IP processing unit 1103 and the IPX processing unit 1104). The network layer processing units then carry out the processings unique to the respective network layers. For example, at the IP processing unit 1103, the TTL field in the packet is reduced, and the router to be sent next is selected from the destination address.

The datagrams processed by the network layer processing units are then given to the network layer protocol multiplexing unit 1102, at which a header having a protocol type field for indicating the network layer is attached to each datagram, the output VPI/VCI is obtained from the address of the router selected above, and the datagram with the header attached is converted into the AAL frame. This AAL frame is then transferred to the transmission buffer 1006 of the output interface by specifying the transfer target memory address. In addition, the output VPI/VCI obtained above is additionally written into the transmission buffer 1006, and the AAL transmission processing unit 1007 disassembles the AAL frame in the transmission buffer 1006 into the ATM cells. Then, the ATM transmission unit 1008 outputs these ATM cells to the ATM network by using the output VPI/VCI written in the transmission buffer 1006.

In the above, the AAL frame to be outputted and the output VPI/VCI are separately transferred to the output ATM NIC, but it is also possible to transfer the AAL frame and the output VPI/VCI simultaneously.

When the output interface is the Ethernet NIC 2000, the AAL frame obtained by converting the datagrams processed at the network layer processing units is transferred to the transmisiosn buffer 2005. Then, at a time of conversion to the AAL frame, the Ethernet address is determined from the address (next hop network layer address) of the selected router, and this Ethernet address is additionally written into the transmission buffer 2005. Then, this Ethernet address is attached to the AAL frame in the transmission buffer 2005, and this AAL frame is transmitted from the Ethernet transmission unit 2006.

(2) A case of AAL transfer

When the output interface is other than the CPU board 1100 at the connection identifier analysis unit 1105, the output interface and the position of the transmission buffer 1006 of the output interface are specified in order to send the AAL frame through the general purpose bus to the output interface written in the connection management table. The AAL frame is transferred from one ATM NIC to another ATM NIC by one of the two schemes described above, and stored in the transmission buffer 1006 of the transmission interface. At this point, the connection identifier analysis unit 1105 enters the VPI/VCI to be used for transmission in the transmission buffer 1006. Then, the AAL transmission processing unit 1007 converts the AAL frame into the ATM cells, and the ATM transmission unit 1008 outputs the ATM cells to the ATM network by using the VPI/VCI written in the transmission buffer 1006.

In the above, the AAL frame to be outputted and the output VPI/VCI are separately transferred to the output ATM NIC, but it is also possible for the connection identifier analysis unit 1105 to convert the input VPI/VCI of the reception buffer 1003 into the output VPI/VCI, and transfer the AAL frame and the output VPI/VCI simultaneously to the transmission buffer.

When the output interface is the Ethernet NIC 2000, the following two AAL transfer schemes are available.

In the first scheme, the AAL frame is transferred from the ATM NIC which received the ATM cells to the Ethernet NIC of the output interface written in the connection management table, while the connection identifier analysis unit 1105 enters the next hop network layer address written in the connection management table into the transmission buffer 2005, similarly as in the above described case in which the output interface is the ATM NIC. In this case, the Ethernet transmission unit 2006 has an additional function for determining the Ethernet address from the next hop network layer address, so that the corresponding Ethernet address is obtained from the next hop network layer address entered into the transmission buffer 2005, this Ethernet address is attached to the AAL frame in the transmission buffer 2005, and this AAL frame is transmitted to the network.

In the second scheme, only the function for determining the Ethernet address from the next hop network layer address is utilized among the functions provided in the network layer protocol multplexing unit 1102 as described for the above described case of carrying out the network layer processing. In this case, the AAL frame is transferred from the ATM NIC which received the ATM cells, while the Ethernet address corresponding to the next hop network layer address written in the connection management table is obtained, and this Ethernet address is written into the transmission buffer 2005.

In this manner, by connecting a plurality of usual ATM NICs or non-virtual connection oriented NICs to the general purpose bus, it is possible to realize a high speed transfer by transferring the AAL frame as it is, without carrying out the network layer processing.

It is to be noted that the configuration of FIG. 16 can be modified as shown in FIG. 17, where each ATM NIC 1000 has a connection identifier analysis unit 1009 connected between the reception buffer 1003 and the bus transmission unit 1004, instead of the connection identifier analysis unit 1105 provided in the CPU board 1100 in the configuration of FIG. 16. This connection identifier analysis unit 1009 has a table registering output I/F and output VPI/VCI or next hop network layer address in correspondence to input VPI/VCI as shown in FIG. 17. With this modified configuration of FIG. 17, the additional mechanism is necessary for the ATM NIC 1000, but the processing at the CPU board 1100 can be reduced, so that the CPU processing load can be reduced. In this modified configuration of FIG. 17, the operation is mostly similar to that in the configuration of FIG. 16 described above.

It is also to be noted that the configuration of FIG. 16 may be expanded as shown in FIG. 18, where a plurality of general purpose buses 1029 and 1031 and an internal bus 1027 are provided and connected through bridges 1200, while the ATM NICs 1000 and the Ethernet NIC 2000 are connected to the general purpose bus-2 1031, the CPU 1100 is connected to the internal bus 1027, and a display card 1300 and other cards are connected to the general purpose bus-1 1029, such that the display card 1300 and others connected to the general purpose bus-1 1029 will not be affected by the AAL frame transfer between the ATM NIC and another ATM NIC or non-virtual connection oriented NIC. In this expanded configuration of FIG. 18, the AAL frame to be transferred between the ATM NIC and another ATM NIC or non-virtual connection oriented NIC will be transferred only within the general purpose bus-2 1031, and not passed to the general purpose bus-1 1029 by means of the bridge 1200, so that it is possible-to reduce the influence due to the AAL transfer on elements such as the CPU 1100 and the display card 1300 which are connected to buses other than the general purpose bus-2 1031.

As described, according to the present invention, it is possible to improve the transfer efficiency of the router device by determining the information for the transfer control and/or priority control (the network interface which is the transfer target of the datagram or AAL frame, and/or the quality of service of the datagram) from the virtual connection identifier of the entered datagram or the assembled AAL frame, without looking into the datagram content.

In the router device of the first embodiment, the network interface that is the transfer target of the datagram can be determined by referring to a table according to the identifier of the virtual connection from which the datagram is entered, without looking into the datagram content, and the datagram can be transferred to the determined network interface. Here, the router device may include means for applying the network layer processing to the datagram according to the protocol of the network.

This means for applying the network layer processing to the datagram is preferably provided for each network interface. This is because the entered datagrams can be distributed to the output interfaces at high speed according to the identifiers of the virtual connections, and the network layer processings can be applied in parallel at the output interfaces.

Also, in the router device of the second embodiment, the quality of service of the datagram can be determined by referring to a table according to the identifier of the virtual connection from which the datagram is entered, without looking into the datagram content, and the priority control for the datagrams can be carried out according to the determined quality of service.

Also, in the router device of the third embodiment, the network interface that is the transfer target of the datagram and the quality of service of the datagram can be determined by referring to a table according to the identifier of the virtual connection from which the datagram is entered, without looking into the datagram content, and the datagram can be transferred to the determined network interface while carrying out the priority control for the datagrams according to the determined quality of service.

By obtaining the information from the virtual connection identifier before referring to the datagram itself in this manner, the work required for the router device can be reduced and the transfer efficiency of the router device can be improved.

Note that the priority control may be carried out at a stage immediately before the network layer processing according to the protocol of the network is applied, or at a stage immediately before the datagram is outputted to the output side network interface. It is also possible to carry out the priority control at a stage immediately before the datagram analysis to determine the transfer target network interface from the datagram content.

Also, in the router device of the fourth embodiment, the network interface that is the transfer target of the AAL frame and the output virtual connection identifier can be determined by referring to a table according to the identifier of the virtual connection from which the AAL frame is entered, without assembling the datagram from the AAL frame that is assembled at the reception unit and looking into the datagram content, and the AAL frame can be transmitted to the virtual connection having the determined output virtual connection identifier by the transmission unit of the determined network interface. Here, the notification of the determined output virtual connection identifier to the transmission unit and the transfer of the AAL frame to the transmission unit can be done in any desired order.

In this router device of the fourth embodiment, by obtaining the information from the virtual connection identifier without referring to the datagram itself, the transfer efficiency of the router device can be improved. In addition, because of the use of the AAL frame assembling, it is possible to prevent a transfer of those ATM cells which cannot be assembled into the AAL frame because of cell loss or some other causes, so that the utilization efficiency of the transmission channel can be increased.

Also, when AAL5 is used, if the ATM cells received from a plurality of input connections are merged and transmitted to the output connection, it is impossible to assemble the AAL frame at the final destination in a case of the ATM cell transfer. However, by using the AAL transfer, the AAL frames received from a plurality of input connections can be merged and transmitted to the output connection, so that it becomes easier to deal with the multicast.

Note that the transmission unit and the reception unit in this fourth embodiment can be provided in forms of network interface cards.

It is to be noted that, in the fourth embodiment described above, the connection management table of the connection identifier analysis unit is used for determining an output interface to which the datagram is to be transferred, but it is also possible to use the connection management table of the connection identifier analysis unit for determining an output virtual connection identifier corresponding to an input connection identifier, and transfer the datagram such that the datagram is outputted to a virtual connection having a virtual connection identifier identical to the determined output virtual connection identifier, in the similar manner as described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

[1. A router device for transferring datagrams among networks comprising:

network interfaces connected with networks including at least one virtual connection oriented network;

a memory for storing a correspondence between a virtual connection identifier and a transfer target network interface;

connection identifier analysis means for determining a transfer target network interface for a datagram entered from a virtual connection, by referring to the memory according to a virtual connection identifier of the virtual connection; and transfer means for transferring the datagram to the transfer target network interface determined by the connection identifier analysis means.]

[2. The router device of claim 1, further comprising reception means for receiving a datalink frame from the virtual connection and assembling the datalink frame into the datagram.]

[3. The router device of claim 1, wherein the memory also stores a correspondence between a virtual connection identifier and an output virtual connection identifier to be used in a case where a network connected with the transfer target network interface is a virtual connection oriented network.]

[4. The router device of claim 3, wherein the connection identifier analysis means also notifies an output virtual connection identifier for the datagram to the transfer target network interface.]

5. [The] *A* router device [of claim 1] *for transferring datagrams among networks comprising:*

*network interfaces connected with networks including at least one virtual connection oriented network;*

*a memory configured to store a correspondence between a virtual connection identifier and a transfer target network interface;*

*a connection identifier analysis unit configured to determine a transfer target network interface for a datagram entered from a virtual connection, by referring to the memory according to a virtual connection identifier of the virtual connection; and*

*a transfer unit configured to transfer the datagram to the transfer target network interface determined by the connection identifier analysis unit,* wherein the memory also stores a correspondence between [a] *the* virtual connection identifier and a next hop network layer address to be used in a case where network connected with the transfer target network interface is a non-virtual connection oriented network.

6. The router device of claim 5, wherein the connection identifier analysis [means] *unit* also notifies a next hop network layer address for the datagram to the transfer target network interface.

7. [The] *A* router device [of claim 1, further comprising:] *for transferring datagrams among networks comprising:*

*network interfaces connected with networks including at least one virtual connection oriented network;*

*a memory configured to store a correspondence between a virtual connection identifier and a transfer target network interface;*

*a connection identifier analysis unit configured to determine a transfer target network interface for a datagram entered from a virtual connection, by referring to the memory according to a virtual connection identifier of the virtual connection;*

*a transfer unit configured to transfer the datagram to the transfer target network interface determined by the connection identifier analysis unit; and*

*a* datagram analysis [means for registering] *unit configured to register* in advance a correspondence between a datagram content and a transfer target network interface, and [determining] *to determine* a transfer target network interface for the datagram according to a datagram content of the datagram when the memory does not store the transfer target network interface in correspondence to the virtual connection identifier of the virtual connection[;], wherein the transfer [means] *unit* transfers the datagram to the transfer target network interface determined by the datagram analysis [means] *unit* when the memory does not store the transfer target network interface in correspondence to the virtual connection identifier of the virtual connection.

8. [The] *A* router device [of claim 1] *for transferring datagrams among networks comprising:*

*network interfaces connected with networks including at least one virtual connection oriented network;*

*a memory configured to store a correspondence between a virtual connection identifier and a transfer target network interface;*

*a connection identifier analysis unit configured to determine a transfer target network interface for a datagram entered from a virtual connection, by referring to the memory according to a virtual connection identifier of the virtual connection; and*

*a transfer unit configured to transfer the datagram to the transfer target network interface determined by the connection identifier analysis unit,* wherein:

the memory also stores a correspondence between a virtual connection identifier and a quality of service;

the connection identifier analysis [means] *unit* also determines a quality of service for the datagram by referring to the memory according to a virtual connection identifier of the virtual connection; and the router device further comprises:

*a* scheduler [means for applying] *configured to apply* a priority control for datagrams to be transferred by the router device according to the quality of service determined by the connection identifier analysis [means] *unit*, such that the transfer [means] *unit* transfers the datagram to which the priority control is applied by the scheduler [means].

9. The router device of claim 8, further comprising:

*a* datagram analysis [means for registering] *unit configured to register* in advance a correspondence between a datagram content and a transfer target network interface, and [determining] *to determine* a transfer target network interface for the datagram to which the priority control is applied by the scheduler [means] according to a datagram content of the datagram;

wherein the scheduler [means] makes the priority control of orders in which datagrams are given to the datagram analysis [means] *unit*.

10. The router device of claim 8, further comprising:

[processing means for determining] *a processor configured to determine* a transfer target network interface and/or next hop network layer address and *to* [applying] *apply* a network layer processing for the datagram to be transferred by the router device[;], wherein the scheduler [means] makes the priority control of orders in which datagrams are given to the [processing means] *processor*.

[11. The router device of claim 1, further comprising datagram processing means for applying a network layer processing to the datagram to be transferred by the router device.]

12. [The] *A* router device [of claim 11] *for transferring datagrams among networks comprising:*

*network interfaces connected with networks including at least one virtual connection oriented network;*

*a memory configured to store a correspondence between a virtual connection identifier and a transfer target network interface;*

*a connection identifier analysis unit configured to determine a transfer target network interface for a datagram entered from a virtual connection, by referring to the memory according to a virtual connection identifier of the virtual connection; and*

*a transfer unit configured to transfer the datagram to the transfer target network interface determined by the connection identifier analysis unit; and*

*a datagram processing unit configured to apply network layer processing to the datagram to be transferred by the router device*, wherein the datagram processing [means] *unit* is separately provided for each network interface.

[13. A router device for transferring datagrams among networks, comprising:

at least one network interface connected with at least one virtual connection oriented network;

a memory for storing a correspondence between a virtual connection identifier and an output virtual connection identifier;

connection identifier analysis means for determining an output virtual connection identifier for a datagram entered from a virtual connection, by referring to the memory according to a virtual connection identifier of the virtual connection; and transfer means for transferring the datagram such that the datagram is outputted to a virtual connection having the output virtual connection identifier determined by the connection identifier analysis means.]

[14. The router device of claim 13, further comprising reception means for receiving a datalink frame from the virtual connection and assembling the datalink frame into the datagram.]

15. A router device for transferring datagrams among networks, comprising:

at least one network interface connected with at least one virtual connection oriented network;

a memory [for storing] *configured to store* a correspondence between a virtual connection identifier and a quality of service;

*a* connection identifier analysis [means for determining] *unit configured to determine* a quality of service for a datagram entered from a virtual connection, by referring to the memory according to a virtual connection identifier of the virtual connection;

*a* scheduler [means for applying] *configured to apply* a priority control for datagrams to be transferred by the router device according to the quality of service determined by the connection identifier analysis [means] *unit*; and

*a* transfer [means for transferring] *unit configured to transfer* the datagram to which the priority control is applied by the scheduler [means].

16. The router device of claim 15, further comprising:

*a* datagram analysis [means for registering] *unit configured to register* in advance a correspondence between a datagram content and a transfer target network interface, and [determining] *to determine* a transfer target network interface for the datagram to which the priority control is applied by the scheduler [means] according to a datagram content of the datagram[;], wherein the scheduler [means] makes the priority control of orders in which datagrams are given to the datagram analysis [means] *unit*.

17. The router device of claim 15, further comprising:

[processing means for determining] *a processor configured to determine* a transfer target network interface and/or next hop network layer address and *to* apply[ing a] network layer processing for the datagram to be transferred by the router device[;], wherein the scheduler [means] makes the priority control of orders in which datagrams are given to the [processing means] *processor*.

[18. A router device for transferring AAL frames from an ATM network through network interfaces connected with networks including at least one ATM network, each network interface connected with said at least one ATM network including reception means for receiving ATM cells from an ATM network and assembling an AAL frame from the received ATM cells, and transmission means for forming ATM cells from an AAL frame and transmitting the formed ATM cells to an ATM network, the router device comprising:

a memory for storing a correspondence between a virtual connection identifier and a transfer target network interface;

connection identifier analysis means for determining a transfer target network interface for an AAL frame assembled from ATM cells entered from a virtual connection, by referring to the memory according to a virtual connection identifier of the virtual connection;

processing means for determining a transfer target network interface for the AAL frame by assembling datagram from the AAL frame and analyzing the assembled datagram, when the memory does not store the transfer target network interface in correspondence to the virtual connection identifier of the virtual connection; and transfer means for transferring the AAL frame to the transfer target network interface determined by one of the connection identifier analysis means and the processing means.]

[19. An ATM network interface card device for interfacing an ATM network and a bus for connecting other network interfaces connected with other networks, the ATM network interface card device comprising:

reception means for receiving ATM cells from the ATM network and assembling an AAL frame from the received ATM cells;

a memory for storing a correspondence between a virtual connection identifier and a transfer target network interface;

connection identifier analysis means for determining a transfer target network interface for an AAL frame assembled from ATM cells entered from a virtual connection, by referring to the memory according to a virtual connection identifier of the virtual connection; and transfer means for transferring the AAL frame through the bus to the transfer target network interface determined by the connection identifier analysis means.]

20. A router device for transferring datagrams among networks, comprising:

at least one network interface connected with at least one virtual connection oriented network;

a memory [for storing] *configured to store* a correspondence between a virtual connection identifier and a protocol type information indicating a type and/or a version of a protocol;

*a* connection identifier analysis [means for determining] *unit configured to determine* a protocol type information for a datagram entered from a virtual connection, by referring to the memory according to a virtual connection identifier of the virtual connection;

*a* datagram analysis [means for determining] *unit configured to determine* a transfer target network interface/next hop network layer address for the datagram according to a datagram content of the datagram, the datagram analysis [means] *unit* having a plurality of processors in correspondence to different protocols, and the datagram is entered into one of said plurality of processors which corresponds to a protocol of a type and/or a version indicated by the protocol type information determined by the connection identifier analysis [means] *unit*; and

*a* transfer [means for transferring] *unit configured to determine* the datagram to the transfer target network interface/next hop network layer address determined by the datagram analysis [means] *unit*.

[21. A method for transferring datagrams among networks, using a router device having network interfaces connected with networks including at least one virtual connection oriented network, the method comprising the steps of:

storing a correspondence between a virtual connection identifier and a transfer target network interface in a memory provided at the router device;

determining a transfer target network interface for a datagram entered from a virtual connection at the router device, by referring to the memory according to a virtual connection identifier of the virtual connection; and transferring the datagram to the transfer target network interface determined by the determining step.]

[22. A method for transferring datagrams among networks, using a router device having at least one network interface connected with at least one virtual connection oriented network, the method comprising the steps of:

storing a correspondence between a virtual connection identifier and an output virtual connection identifier in a memory provided at the router device;

determining an output virtual connection identifier for a datagram entered from a virtual connection, by referring to the memory according to a virtual connection identifier of the virtual connection; and transferring the datagram such that the datagram is outputted to a virtual connection having the output virtual connection identifier determined by the determining step.]

23. A method for transferring datagrams among networks, using a router device having at least one network interface connected with at least one virtual connection oriented network, the method comprising the steps of:

storing a correspondence between a virtual connection identifier and a quality of service in a memory provided at the router device;

determining a quality of service for a datagram entered from a virtual connection at the router device, by referring to the memory according to a virtual connection identifier of the virtual connection;

applying a priority control for datagrams to be transferred by the router device according to the quality of service determined by the determining step; and transferring the datagram to which the priority control is applied by the applying step.

[24. A method for transferring AAL frames from an ATM network, using a router device having network interfaces connected with networks including at least one ATM network, each network interface connected with said at least one ATM network including reception means for receiving ATM cells from an ATM network and assembling an AAL frame from the received ATM cells, and transmission means for forming ATM cells from an AAL frame and transmitting the formed ATM cells to an ATM network, the method comprising the steps of:

storing a correspondence between a virtual connection identifier and a transfer target network interface in a memory provided at the router device;

determining a transfer target network interface for an AAL frame assembled from ATM cells entered from a virtual connection, by referring to the memory according to a virtual connection identifier of the virtual connection;

processing the AAL frame to determine a transfer target network interface for the AAL frame by assembling datagram from the AAL frame and analyzing the assembled datagram, when the memory does not store the transfer target network interface in correspondence to the virtual connection identifier of the virtual connection; and transferring the AAL frame to the transfer target network interface determined by one of the determining step and the processing step.]

[25. A method for interfacing an ATM network and a bus for connecting other network interfaces connected with other networks, the method comprising the steps of:

receiving ATM cells from the ATM network and assembling an AAL frame from the received ATM cells;

storing a correspondence between a virtual connection identifier and a transfer target network interface in a memory;

determining a transfer target network interface for an AAL frame assembled from ATM cells entered from a virtual connection, by referring to the memory according to a virtual connection identifier of the virtual connection; and transferring the AAL frame through the bus to the transfer target network interface determined by the determining step.]

26. A method for transferring datagrams among networks, using a router device having at least one network interface connected with at least one virtual connection oriented network, the method comprising the steps of:

storing a correspondence between a virtual connection identifier and a protocol type information indicating a type and/or a version of a protocol in a memory provided at the router device;

determining a protocol type information for a datagram entered from a virtual connection, by referring to the memory according to a virtual connection identifier of the virtual connection;

determining a transfer target network interface/next hop network layer address for the datagram according to a datagram content of the datagram, wherein a plurality of processors are provided at the router device in correspondence to different protocols, and the datagram is entered into one of said plurality of processors which corresponds to a protocol of a type and/or a version indicated by the protocol type information determined by the determining step; and transferring the datagram to the determined transfer target network interface/next hop network layer address.

[27. A data communication network system, comprising:

networks including at least one virtual connection oriented network;

a transmission node provided in each network for transmitting datagrams such that datagrams destined to an identical destination are transmitted through at least one specific virtual connection; and a router device for connecting at least two of the networks, the router device including:

network interfaces connected with said at least two of the networks;

a memory for storing a correspondence between a virtual connection identifier and a transfer target network interface;

connection identifier analysis means for determining a transfer target network interface for a datagram entered from a virtual connection, by referring to the memory according to a virtual connection identifier of the virtual connection; and transfer means for transferring the datagram to the transfer target network interface determined by the connection identifier analysis means.]

[28. A data communication network system, comprising:

networks including at least one virtual connection oriented network;

a transmission node provided in each network for transmitting datagrams such that datagrams destined to an identical destination are transmitted through at least one specific virtual connection; and a router device for connecting at least two of the networks, the router device including:

at least one network interface connected with said at least two of the networks;

a memory for storing a correspondence between a virtual connection identifier and an output virtual connection identifier;

connection identifier analysis means for determining an output virtual connection identifier for a datagram entered from a virtual connection, by referring to the memory according to a virtual connection identifier of the virtual connection; and transfer means for transferring the datagram such that the datagram is outputted to a virtual connection having the output virtual connection identifier determined by the connection identifier analysis means.]

29. A data communication network system, comprising:

networks including at least one virtual connection oriented network;

a transmission node provided in each network [for transmitting] *configured to transmit* datagrams such that datagrams with an identical quality of service are transmitted through at least one specific virtual connection; and a router device [for connecting] *configured to connect* at least two of the networks, the router device including[:], at least one network interface connected with said at least two of the networks[;], a memory [for storing] *configured to store* a correspondence between a virtual connection identifier and a quality of service[;],

*a* connection identifier analysis unit [means for determining] *configured to determine* a quality of service for a datagram entered from a virtual connection, by referring to the memory according to a virtual connection identifier of the virtual connection[;],

*a* scheduler [means for applying] *configured to apply* a priority control for datagrams to be transferred by the router device according to the quality of service determined by the connection identifier analysis means[;], and

*a* transfer [means for transferring] *unit configured to transfer* the datagram to which the priority control is applied by the scheduler[means].

[30. A data communication network system, comprising:

networks including at least one ATM network;

a transmission node provided in each network for transmitting datagrams such that datagrams destined to an identical destination are transmitted through at least one specific virtual connection; and a router device for connecting at least two of the networks, and for transferring AAL frames from an ATM network through network interfaces connected with the networks, each network interface connected with said at least one ATM network including reception means for receiving ATM cells from an ATM network and assembling an AAL frame from the received ATM cells, and transmission means for forming ATM cells from an AAL frame and transmitting the formed ATM cells to an ATM network, the router device including:

a memory for storing a correspondence between a virtual connection identifier and a transfer target network interface;

connection identifier analysis means for determining a transfer target network interface for an AAL frame assembled from ATM cells entered from a virtual connection, by referring to the memory according to a virtual connection identifier of the virtual connection;

processing means for determining a transfer target network interface for the AAL frame by assembling datagram from the AAL frame and analyzing the assembled datagram, when the memory does not store the transfer target network interface in correspondence to the virtual connection identifier of the virtual connection; and transfer means for transferring the AAL frame to the transfer target network interface determined by one of the connection identifier analysis means and the processing means.]

[31. A data communication network system, comprising:

networks including at least one ATM network;

a transmission node provided in each network for transmitting datagrams such that datagrams destined to an identical destination are transmitted through at least one specific virtual connection; and a router device for connecting at least two of the networks including an ATM network; and an ATM network interface card device for interfacing an ATM network and a bus for connecting other network interfaces connected with other networks, the ATM network interface card device including:

reception means for receiving ATM cells from the ATM network and assembling an AAL frame from the received ATM cells;

a memory for storing a correspondence between a virtual connection identifier and a transfer target network interface;

connection identifier analysis means for determining a transfer target network interface for a AAL frame assembled from ATM cells entered from a virtual connection, by referring to the memory according to a virtual connection identifier of the virtual connection; and transfer means for transferring the AAL frame through the bus to the transfer target network interface determined by the connection identifier analysis means.]

32. A data communication network system, comprising:

networks including at least one virtual connection oriented network;

a transmission node provided in each network [for transmitting] *configured to transmit* datagrams such that datagrams of an identical protocol type and/or version are transmitted through at least one specific virtual connection; and a router device [for connecting] *configured to connect* at least two of the networks, the router device including[:], at least one network interface connected with said at least two of the networks[;], a memory [for storing] *configured to store* a correspondence between a virtual connection identifier and a protocol type information indicating a type and/or a version of a protocol[;],

*a* connection identifier analysis [means for determining] *unit configured to determine* a protocol type information for a datagram entered from a virtual connection, by referring to the memory according to a virtual connection identifier of the virtual connection[;],

*a* datagram analysis unit [means for determining] *configured to determine* a transfer target network interface/next hop network layer address for the datagram according to a datagram content of the datagram, the datagram analysis [means] *unit* having a plurality of processors in correspondence to different protocols, and the datagram is entered into one of said plurality of processors which corresponds to a protocol of a type and/or a version indicated by the protocol type information determined by the connection identifier analysis [means;] *unit,* and

*a* transfer [means for transferring] *unit configured to transfer* the datagram to the transfer target network interface/next hop network layer address determined by the datagram analysis [means] *unit*.

[33. A transmission node device for transmitting datagrams to a router device, comprising:

a memory for storing a correspondence between a destination and an output virtual connection identifier, the correspondence being known to the router device;

datagram analysis means for determining an output virtual connection identifier for a datagram to be transmitted, by referring to the memory according to a destination of the datagram; and transmission means for transmitting the datagram to a virtual connection having the output virtual connection identifier determined by the datagram analysis means, such that datagrams destined to an identical destination are transmitted through at least one specific virtual connection.]

34. A transmission node device for transmitting datagrams to a router device, comprising:

a memory [for storing] *configured to store* a correspondence between a quality of service specifying information indicating a quality of service and an output virtual connection identifier, the correspondence being known to the router device;

*a* datagram analysis [means for determining] *unit configured to determine* an output virtual connection identifier for a datagram to be transmitted, by referring to the memory according to a quality of service specifying information of the datagram; and

*a* transmission [means for transmitting] *unit configured to transfer* the datagram to a virtual connection having a virtual connection identifier identical to the output virtual connection identifier determined by the datagram analysis [means] *unit*, such that datagrams with an identical quality of service specifying information are transmitted through at least one specific virtual connection.

35. A transmission node device for transmitting datagrams to a router device, comprising:

a memory [for storing] *configured to store* a correspondence between a protocol type information indicating a type and/or a version of a protocol and an output virtual connection identifier, the correspondence being known to the router device;

*a* datagram analysis [means for determining] *unit configured to determine* an output virtual connection identifier for a datagram to be transmitted, by referring to the memory according to a type and/or a version of a protocol of the datagram; and

*a* transmission [means for transmitting] *unit configured to transmit* the datagram to a virtual connection having a virtual connection identifier identical to the output virtual connection identifier determined by the datagram analysis [means] *unit*, such that datagrams of an identical protocol type and/or version are transmitted through at least one specific virtual connection.

[36. A method for transmitting datagrams to a router device, comprising the steps of:

storing in a memory a correspondence between a destination and an output virtual connection identifier, the correspondence being known to the router device;

determining an output virtual connection identifier for a datagram to be transmitted, by referring to the memory according to a destination of the datagram; and transmitting the datagram to a virtual connection having the output virtual connection identifier determined by the determining step, such that datagrams destined to an identical destination are transmitted through at least one specific virtual connection.]

37. A method for transmitting datagrams to a router device, comprising the steps of:

storing in a memory a correspondence between a quality of service specifying information indicating a quality of service and an output virtual connection identifier, the correspondence being known to the router device;

determining an output virtual connection identifier for a datagram to be transmitted, by referring to the memory according to a quality of service specifying information of the datagram; and transmitting the datagram to a virtual connection having a virtual connection identifier identical to the output virtual connection identifier determined by the determining step, such that datagrams with an identical quality of service specifying information are transmitted through at least one specific virtual connection.

38. A method for transmitting datagrams to a router device, comprising the steps of:

storing in a memory a correspondence between a protocol type information indicating a type and/or a version of a protocol and an output virtual connection identifier, the correspondence being known to the router device;

determining an output virtual connection identifier for a datagram to be transmitted, by referring to the memory according to a type and/or a version of a protocol of the datagram; and transmitting the datagram to a virtual connection having a virtual connection identifier identical to the output virtual connection identifier determined by the determining step, such that datagrams of an identical protocol type and/or version are transmitted through at least one specific virtual connection.

*39. A router device for transferring datagrams among networks comprising:*

*network interfaces connected with networks including at least one virtual connection oriented network and at least one non-virtual connection oriented network;*

*a memory configured to store a correspondence between a virtual connection identifier and a transfer target network interface, and also to store a correspondence between the virtual connection identifier and a network layer address;*

*a first connection identifier analysis unit configured to determine a transfer target network interface for a*

*datagram entered from a virtual connection, by referring to the memory according to a virtual connection identifier of the virtual connection;*

*a second connection identifier analysis unit configured to determine a transfer target network layer address for the datagram entered from the virtual connection, by referring to the memory according to the virtual connection identifier of the virtual connection;*

*a first transfer unit configured to transfer the datagram to the transfer target network interface connected with another virtual connection oriented network, when the transfer target network interface is determined by the first connection identifier analysis unit; and*

*a second transfer unit configured to transfer the datagram to the transfer target network interface connected with the at least one non-virtual connection oriented network toward the transfer target network layer address, when the transfer target network layer address is determined by the second connection identifier analysis unit.*

*40. A router device according to claim 39, wherein:*

*the transfer target network interface is configured to transfer the datagrams toward a datalink address determined using the transfer target network layer address.*

*41. A router device according to claim 39, wherein:*

*a transfer target of the datagram is determined without referring to the datagram content.*

*42. A method for transferring datagrams among networks, using a router device having network interfaces connected with networks including at least one virtual connection oriented network and at least one non-virtual connection oriented network, the method comprising the steps of:*

*storing a correspondence between a virtual connection identifier and a transfer target network interface in a memory provided at the router device, and also storing a correspondence between the virtual connection identifier and a network layer address*

*first determining a transfer target network interface for a datagram entered from a virtual connection at the router device, by referring to the memory according to a virtual connection identifier of the virtual connection;*

*second determining a transfer target network layer address for the datagram entered from the virtual connection, by referring to the memory according to the virtual connection identifier of the virtual connection;*

*first transferring the datagram to the transfer target network interface connected with another virtual connection oriented network, when the transfer target network interface is determined by the first determining step; and*

*second transferring the datagram to the transfer target network interface connected with the at least one non-virtual connection oriented network toward the transfer target network layer address, when the transfer target network layer address is determined by the second determining step.*

*43. A method according to claim 42, wherein:*

*the step of second transferring transmits the datagrams from the transfer target network interface toward a datalink address determined using the transfer target network layer address.*

*44. A method according to claim 42, wherein:*

*the step of determining the transfer target network layer address is performed without referring to the datagram content.*

*45. A method for transferring datagrams among networks, using at least two router devices having network interfaces connected with networks including at least one virtual connection oriented network, the method comprising the steps of:*

*storing a correspondence between a virtual connection identifier and a transfer target network interface in a memory provided at a router device;*

*determining transfer target network interface for a datagram entered from a virtual connection at the router device, by referring to the memory according to a virtual connection identifier of the virtual connection on which the datagram is received;*

*transferring the datagram to the transfer target network interface determined by the determining step;*

*first transmitting the datagram along with another virtual connection identifier from the transfer target network interface over a second virtual connection to another router device;*

*receiving the datagram, at said another router device, from the transfer target network interface at the router device over the second virtual connection;*

*removing said another virtual connection identifier from the datagram at said another router device; and*

*second transmitting said datagram, at said another router device, away from said another router device without said another virtual connection identifier, and without adding another virtual connection identifier.*

*46. A method according to claim 45, wherein said step of second transmitting said datagram away from said another router device comprises transmitting said datagram over a non-virtual connection oriented network.*

*47. A method according to claim 46, wherein said step of second transmitting said datagram way from said another router device comprises transmitting said datagram to a location using a network layer address associated with the datagram.*

*48. A method according to claim 45, wherein said step of second transmitting said datagram way from said another router device comprises transmitting said datagram to a location using a network layer address associated with the datagram.*

*49. A method according to claim 48, wherein said step of second transmitting said datagram way from said another router device comprises transmitting said datagram without referring to the datagram content to a location using a network layer address associated with the datagram.*

*50. A method for transferring datagrams among networks, using a router device having network interfaces connected with networks including at least one virtual connection oriented network, the method comprising the steps of:*

*storing a correspondence between a virtual connection identifier and a transfer target network interface in a memory provided at the router device;*

*determining a transfer target network interface for a datagram entered from a virtual connection at the router device, by referring to the memory according to a virtual connection identifier of the virtual connection on which the datagram is received;*

*transferring the datagram to the transfer target network interface determined by the determining step; and*

*transmitting said datagram from the router device without said virtual connection identifier, and without adding another virtual connection identifier.*

*51. A plurality of router devices for transferring datagrams among networks, comprising:*

*a first router device including,*

*a first set of network interfaces connected to at least a first virtual connection oriented network,*

*a first memory configured to store a first correspondence between a first input virtual connection identifier and a first transfer target network interface,*

*a first connection identifier analysis unit configured to determine the first transfer target network interface for a first datagram entered from a first input virtual connection, by referring to the first memory according to the first input virtual connection identifier of the first virtual connection, and*

*a first transfer unit configured to transfer the first datagram to the first transfer target network interface determined by the first connection identifier analysis unit; and*

*a second router device including,*

*a second set of network interfaces connected to at least a second virtual connection oriented network,*

*a second memory configured to store a second correspondence between a second input virtual connection identifier and a next hop layer address to be used in a case where the second set of network interfaces is connected to at least a non-virtual connection oriented network,*

*a second connection identifier analysis unit configured to determine a second transfer target network interface for a second datagram entered from a second input virtual connection, by referring to the second memory according to the second input virtual connection identifier of the second virtual connection, and*

*a second transfer unit configured to transfer the second datagram to the second transfer target network interface determined by the second connection identifier analysis unit.*

*52. A method for transferring datagrams among networks, using a first router device and a second router device having network interfaces connected with networks including at least one virtual connection oriented network, the method comprising the steps of:*

*storing a correspondence between a first virtual connection identifier and a first transfer target network interface in a memory provided at the first router device;*

*determining a first transfer target network interface for a datagram entered from a first virtual connection at the first router, by referring to the memory provided at the first router device according to a virtual connection identifier of the first virtual connection;*

*transferring the datagram entered from the first virtual connection to the first transfer target network interface determined by the determining step;*

*storing a correspondence between a second virtual connection identifier and a second transfer target network interface in a memory provided at the second router device, said second transfer target network interface being connected to a next hop network layer address to be used in a case where the network interfaces of the second router is connected to at least a non-virtual connection oriented network;*

*determining a second transfer target network interface for a datagram entered from a second virtual connection at the second router, by referring to the memory provided at the second router device according to a virtual connection identifier of the second virtual connection;*

*transferring the datagram entered at the second virtual connection to the second transfer target network interface determined by the determining step.*

*53. A plurality of router devices for transferring datagrams among networks, comprising:*

*a first router device including,*

*a first set of network interfaces connected to at least a first virtual connection oriented network,*

*a first memory configured to store a first correspondence between a first input virtual connection identifier and a first output virtual connection identifier,*

*a first connection identifier analysis unit configured to determine the first transfer target network interface for a first datagram entered from a first input virtual connection, by referring to the first memory according to the first input virtual connection identifier of the first virtual connection, and*

*a first transfer unit configured to transfer the first datagram to the first transfer target network interface determined by the first connection identifier analysis unit*

*a second router device including,*

*a second set of network interfaces connected to at least a second virtual connection oriented network,*

*a second memory configured to store a second correspondence between a second input virtual connection identifier, a second transfer target network interface, and a second output virtual connection identifier,*

*a second connection identifier analysis unit configured to determine the second transfer target network interface for a second datagram entered from a second input virtual connection, by referring to the second memory according to the second input virtual connection identifier of the second virtual connection, and*

*a second transfer unit configured to transfer the second datagram to the second transfer target network interface determined by the second connection identifier analysis unit without attaching said second output virtual connection identifier to said second datagram.*

*54. A method for transferring datagrams among networks, using a first router device and a second router device having network interfaces connected with networks including at least one virtual connection oriented network, the method comprising the steps of:*

*storing a correspondence between a first virtual connection identifier and a first transfer target network interface in a memory provided at the first router device;*

*determining a first transfer target network interface for a datagram entered from a first virtual connection at the first router, by referring to the memory provided at the first router device according to a virtual connection identifier of the first virtual connection;*

*transferring the datagram entered from the first virtual connection to the first transfer target network interface determined by the determining step;*

*storing a correspondence between a second virtual connection identifier and a second transfer target network interface in a memory provided at the second router device;*

*determining a second transfer target network interface for a datagram entered from a second virtual connection at the second router, by referring to the memory provided at the second router device according to a virtual connection identifier of the second virtual connection; and*

*transferring the datagram entered at the second virtual connection to the second transfer target network interface determined by the determining step without attaching an output virtual connection identifier to said datagram entered from the second virtual connection.*

* * * * *